(12) United States Patent
Hayashi et al.

(10) Patent No.: US 8,321,629 B2
(45) Date of Patent: Nov. 27, 2012

(54) STORAGE SYSTEM, CONTROL METHODS FOR THE SAME WITH DATA MIGRATION ON POWER CAPPED CHASSIS

(75) Inventors: Shinichi Hayashi, Kawasaki (JP); Yuichi Taguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 502 days.

(21) Appl. No.: 12/527,450

(22) PCT Filed: Apr. 21, 2009

(86) PCT No.: PCT/JP2009/001816
§ 371 (c)(1),
(2), (4) Date: Aug. 17, 2009

(87) PCT Pub. No.: WO2010/122596
PCT Pub. Date: Oct. 28, 2010

(65) Prior Publication Data
US 2011/0208937 A1    Aug. 25, 2011

(51) Int. Cl.
*G06F 12/08* (2006.01)
*G06F 1/32* (2006.01)

(52) U.S. Cl. .......... 711/114; 711/165; 711/E12.016; 713/320

(58) Field of Classification Search .............. None
See application file for complete search history.

(56) References Cited

U.S. PATENT DOCUMENTS

| | | | |
|---|---|---|---|
| 7,814,351 B2* | 10/2010 | Lubbers et al. | 713/300 |
| 2003/0093439 A1 | 5/2003 | Mogi et al. | |
| 2007/0061512 A1* | 3/2007 | Taguchi et al. | 711/114 |
| 2007/0113037 A1 | 5/2007 | Eguchi et al. | |
| 2007/0143542 A1* | 6/2007 | Watanabe et al. | 711/114 |
| 2007/0250679 A1* | 10/2007 | Umemura et al. | 711/170 |
| 2007/0271413 A1* | 11/2007 | Fujibayashi et al. | 711/112 |
| 2008/0114931 A1* | 5/2008 | Aoki | 711/114 |

FOREIGN PATENT DOCUMENTS

| | | |
|---|---|---|
| EP | 1 770 499 A1 | 4/2007 |
| EP | 2 012 226 A2 | 1/2009 |
| JP | 2007-293442 A | 11/2007 |

OTHER PUBLICATIONS

Vijay Sundaram et al. "Efficient Data Migration in Self-managing Storage Systems." Jun. 2006. IEEE. ICAC '06.*

* cited by examiner

*Primary Examiner* — Charles Rones
*Assistant Examiner* — Nathan N Sadler
(74) *Attorney, Agent, or Firm* — Mattingly & Malur, PC

(57) ABSTRACT

The present invention calculates the power consumption of the storage system for each device which supplies power with a storage system, and controls the storage system to keep the power consumption not to exceed the upper limit. In order to achieve this, the power consumption of the chassis configuring the destination storage system is calculated with reference to the number of logical volumes configuring the pool which includes virtual logical volumes, and the logical volumes included in the source storage system are migrated to the virtual logical volumes included in the destination storage system, keeping the power consumption specified in advance per device supplying power to the chassis configuring the destination storage system not to exceed the upper limit value. (Refer to FIG. 27.)

14 Claims, 27 Drawing Sheets

FIG. 12

| SOURCE /DESTINATION | CHASSIS ID | POWER DISTRIBUTION BOARD ID | LIMIT POWER CONSUMPTION | MIGRATION LIMIT RATE | OPTIMIZATION THRESHOLD |
|---|---|---|---|---|---|
| SOURCE | DISK CHASSIS #1 | POWER DISTRIBUTION BOARD #1 | 3,000 W | 70% | 90% |
| SOURCE | CONTROL CHASSIS | POWER DISTRIBUTION BOARD #2 | 3,000 W | 70% | 90% |
| SOURCE | DISK CHASSIS #2 | POWER DISTRIBUTION BOARD #3 | 3,000 W | 70% | 90% |
| DESTINATION | DISK CHASSIS #3 | POWER DISTRIBUTION BOARD #4 | 3,000 W | 70% | 90% |
| DESTINATION | VIRTUAL CONTROL CHASSIS | POWER DISTRIBUTION BOARD #5 | 3,000 W | 70% | 90% |
| DESTINATION | DISK CHASSIS #4 | POWER DISTRIBUTION BOARD #6 | 3,000 W | 70% | 90% |

FIG. 13

| SOURCE / DESTINATION | HDD ID | CHASSIS ID | RG ID | TYPE | CAPACITY | OPERATION RATE |
|---|---|---|---|---|---|---|
| SOURCE | HDD #1 | CONTROL CHASSIS | RG #1 | FC, 3.5 inch, 15,000 rpm | 450 GB | 20% |
| SOURCE | HDD #2 | CONTROL CHASSIS | RG #1 | FC, 3.5 inch, 15,000 rpm | 450 GB | 20% |
| SOURCE | HDD #3 | CONTROL CHASSIS | RG #1 | FC, 3.5 inch, 15,000 rpm | 450 GB | 20% |
| SOURCE | HDD #4 | CONTROL CHASSIS | RG #1 | FC, 3.5 inch, 15,000 rpm | 450 GB | 20% |
| SOURCE | HDD #5 | DISK CHASSIS #1 | RG #2 | FC, 3.5 inch, 10,000 rpm | 300 GB | 15% |
| SOURCE | HDD #6 | DISK CHASSIS #1 | RG #2 | FC, 3.5 inch, 10,000 rpm | 300 GB | 15% |
| SOURCE | HDD #7 | DISK CHASSIS #1 | RG #2 | FC, 3.5 inch, 10,000 rpm | 300 GB | 15% |
| SOURCE | HDD #8 | DISK CHASSIS #1 | RG #2 | FC, 3.5 inch, 10,000 rpm | 300 GB | 15% |
| SOURCE | HDD #9 | DISK CHASSIS #2 | RG #3 | SATA, 3.5inch, 7,200 rpm | 1000 GB | 10% |
| SOURCE | HDD #10 | DISK CHASSIS #2 | RG #3 | SATA, 3.5inch, 7,200 rpm | 1000 GB | 10% |
| SOURCE | HDD #11 | DISK CHASSIS #2 | RG #3 | SATA, 3.5inch, 7,200 rpm | 1000 GB | 10% |
| SOURCE | HDD #12 | DISK CHASSIS #2 | RG #3 | SATA, 3.5inch, 7,200 rpm | 1000 GB | 10% |
| .. | .. | .. | .. | .. | .. | .. |

FIG. 14

| SOURCE /DESTINATION | HDD ID | CHASSIS ID | RG ID | TYPE | CAPC-ITY | OPER-ATION RATE |
|---|---|---|---|---|---|---|
| .. | .. | .. | .. | .. | .. | .. |
| DESTINATION | HDD #13 | VIRTUAL CONTROL CHASSIS | RG #4 | FC, 3.5 inch, 15,000 rpm | 450 GB | 0% |
| DESTINATION | HDD #14 | VIRTUAL CONTROL CHASSIS | RG #4 | FC, 3.5 inch, 15,000 rpm | 450 GB | 0% |
| DESTINATION | HDD #15 | VIRTUAL CONTROL CHASSIS | RG #4 | FC, 3.5 inch, 15,000 rpm | 450GB | 0% |
| DESTINATION | HDD #16 | VIRTUAL CONTROL CHASSIS | RG #4 | FC, 3.5 inch, 15,000 rpm | 450 GB | 0% |
| DESTINATION | HDD #17 | DISK CHASSIS #3 | RG #5 | FC, 3.5 inch, 15,000 rpm | 450 GB | 0% |
| DESTINATION | HDD #18 | DISK CHASSIS #3 | RG #5 | FC, 3.5 inch, 15,000 rpm | 450 GB | 0% |
| DESTINATION | HDD #19 | DISK CHASSIS #3 | RG #5 | FC, 3.5 inch, 15,000 rpm | 450 GB | 0% |
| DESTINATION | HDD #20 | DISK CHASSIS #3 | RG #5 | FC, 3.5 inch, 15,000 rpm | 450 GB | 0% |
| DESTINATION | HDD #21 | DISK CHASSIS #4 | RG #6 | FC, 3.5 inch, 15,000 rpm | 450 GB | 0% |
| DESTINATION | HDD #22 | DISK CHASSIS #4 | RG #6 | FC, 3.5 inch, 15,000 rpm | 450 GB | 0% |
| DESTINATION | HDD #23 | DISK CHASSIS #4 | RG #6 | FC, 3.5 inch, 15,000 rpm | 450 GB | 0% |
| DESTINATION | HDD #24 | DISK CHASSIS #4 | RG #6 | FC, 3.5 inch, 15,000 rpm | 450 GB | 0% |

FIG. 15

| SOURCE /DESTINATION | RG ID | RAID LEVEL | CAPACITY | AVAILABLE CAPACITY | LOAD | LIMIT LOAD |
|---|---|---|---|---|---|---|
| SOURCE | RG #1 | RAID 1 (2D+2D) | 900 GB | 500 GB | 180 IOPS | 1,000 IOPS |
| SOURCE | RG #2 | RAID 5 (3D+1P) | 900 GB | 500 GB | 100 IOPS | 700 IOPS |
| SOURCE | RG #3 | RAID 5 (3D+1P) | 2,000 GB | 1,800 GB | 30 IOPS | 300 IOPS |
| DESTINATION | RG #4 | RAID 5 (3D+1P) | 1,350 GB | 1,350 GB | 0 IOPS | 700 IOPS |
| DESTINATION | RG #5 | RAID 5 (3D+1P) | 1,350 GB | 1,350 GB | 0 IOPS | 700 IOPS |
| DESTINATION | RG #6 | RAID 5 (3D+1P) | 1,350 GB | 1,350 GB | 0 IOPS | 700 IOPS |

FIG. 16

| SOURCE /DESTINATION | LOGICAL VOLUME ID | RG ID | LOAD | LIMIT LOAD | CAPACITY | AVAILABLE CAPACITY | POOL ID |
|---|---|---|---|---|---|---|---|
| SOURCE | LOGICAL VOLUME #1 | RG #1 | 100 IOPS | 500 IOPS | 450 GB | 250 GB | - |
| SOURCE | LOGICAL VOLUME #2 | RG #1 | 80 IOPS | 500 IOPS | 450 GB | 250 GB | - |
| SOURCE | LOGICAL VOLUME #3 | RG #2 | 60 IOPS | 350 IOPS | 450 GB | 250 GB | - |
| SOURCE | LOGICAL VOLUME #4 | RG #2 | 40 IOPS | 350 IOPS | 450 GB | 250 GB | - |
| SOURCE | LOGICAL VOLUME #5 | RG #3 | 20 IOPS | 150 IOPS | 200 GB | 100 GB | - |
| SOURCE | LOGICAL VOLUME #6 | RG #3 | 10 IOPS | 150 IOPS | 200 GB | 100 GB | - |
| DESTINATION | LOGICAL VOLUME #7 | RG #4 | 0 IOPS | 350 IOPS | 675 GB | 675 GB | POOL #1 |
| DESTINATION | LOGICAL VOLUME #8 | RG #4 | 0 IOPS | 350 IOPS | 675 GB | 675 GB | POOL #1 |
| DESTINATION | LOGICAL VOLUME #9 | RG #5 | 0 IOPS | 350 IOPS | 675 GB | 675 GB | POOL #1 |
| DESTINATION | LOGICAL VOLUME #10 | RG #5 | 0 IOPS | 350 IOPS | 675 GB | 675 GB | POOL #2 |
| DESTINATION | LOGICAL VOLUME #11 | RG #6 | 0 IOPS | 350 IOPS | 675 GB | 675 GB | POOL #2 |
| DESTINATION | LOGICAL VOLUME #12 | RG #7 | 0 IOPS | 350 IOPS | 675 GB | 675 GB | POOL #2 |

FIG. 17

| CHASSIS TYPE | HDD TYPE | RAID LEVEL | FORMULA FOR POWER CONSUMPTION |
|---|---|---|---|
| CONTROL CHASSIS | - | - | b1 |
| VIRTUAL CONTROL CHASSIS | - | - | b2 |
| DISK CHASSIS | - | - | b3 |
| - | FC, 3.5 inch, 15,000rpm, 450GB | RAID 1 (2D+2D) | a4x + b4 ~1706<br>a5y + b5 ~1707 |
| - | SATA, 3.5 inch, 7,200rpm, 1000GB | RAID 1 (2D+2D) | a6x + b6<br>a7y + b7 |
| - | FC, 3.5 inch, 15,000rpm, 450GB | RAID 1 (4D+4D) | a8x + b8<br>a9y + b9 |
| - | SATA, 3.5 inch, 7,200rpm, 1000GB | RAID 1 (4D+4D) | a10x + b10<br>a11y + b11 |
| - | FC, 3.5 inch, 15,000rpm, 450GB | RAID 5 (3D+1P) | a12x + b12<br>a13y + b13 |
| - | SATA, 3.5 inch, 7,200rpm, 1000GB | RAID 5 (3D+1P) | a14x + b14<br>a15y + b15 |
| .. | .. | .. | .. |

| | 1802 | 1803 | 1804 | 1805 | 1806 | 1807 |
|---|---|---|---|---|---|---|
| | SOURCE / DESTINATION | POOL ID | LOAD | LIMIT LOAD | CAPACITY | AVAILABLE CAPACITY |
| | DESTINATION | POOL #1 | 300 IOPS | 1,050 IOPS | 2,025 GB | 25 GB |
| | DESTINATION | POOL #2 | 10 IOPS | 1,050 IOPS | 2,025 GB | 1,925 GB |

| VIRTUAL LOGICAL VOLUME ID | POOL ID | CAPACITY | AVAILABLE CAPACITY |
|---|---|---|---|
| VIRTUAL LOGICAL VOLUME #1 | POOL #1 | 450 GB | 250 GB |
| VIRTUAL LOGICAL VOLUME #2 | POOL #1 | 450 GB | 250 GB |
| VIRTUAL LOGICAL VOLUME #3 | POOL #1 | 450 GB | 250 GB |
| VIRTUAL LOGICAL VOLUME #4 | POOL #1 | 450 GB | 250 GB |
| VIRTUAL LOGICAL VOLUME #5 | POOL #1 | 200 GB | 100 GB |
| VIRTUAL LOGICAL VOLUME #6 | POOL #2 | 200 GB | 100 GB |

FIG. 20

| VIRTUAL LOGICAL VOLUME ID | START ADDRESS | END ADDRESS | LOGICAL VOLUME ID | START ADDRESS | END ADDRESS |
|---|---|---|---|---|---|
| VIRTUAL LOGICAL VOLUME #1 | 0 | 99 | LOGICAL VOLUME #7 | 0 | 99 |
| VIRTUAL LOGICAL VOLUME #1 | 100 | 199 | LOGICAL VOLUME #8 | 0 | 99 |
| VIRTUAL LOGICAL VOLUME #1 | 200 | 299 | LOGICAL VOLUME #9 | 0 | 99 |
| VIRTUAL LOGICAL VOLUME #1 | 300 | 399 | LOGICAL VOLUME #7 | 100 | 199 |
| VIRTUAL LOGICAL VOLUME #2 | 0 | 99 | LOGICAL VOLUME #8 | 100 | 199 |
| .. | .. | .. | .. | .. | .. |

FIG. 21

| POOL ID | LOAD THRESHOLD | CAPACITY THRESHOLD |
|---|---|---|
| POOL #1 | 70% | 90% |
| POOL #2 | 70% | 90% |

| EXTERNAL LOGICAL VOLUME ID | LOGICAL VOLUME ID |
|---|---|
| EXTERNAL LOGICAL VOLUME #1 | LOGICAL VOLUME #1 |
| EXTERNAL LOGICAL VOLUME #2 | LOGICAL VOLUME #2 |
| EXTERNAL LOGICAL VOLUME #3 | LOGICAL VOLUME #3 |
| EXTERNAL LOGICAL VOLUME #4 | LOGICAL VOLUME #4 |
| EXTERNAL LOGICAL VOLUME #5 | LOGICAL VOLUME #5 |
| EXTERNAL LOGICAL VOLUME #6 | LOGICAL VOLUME #6 |

2202, 2203, 2201

US 8,321,629 B2

STORAGE SYSTEM, CONTROL METHODS FOR THE SAME WITH DATA MIGRATION ON POWER CAPPED CHASSIS

TECHNICAL FIELD

The present invention relates to a storage system, control methods for the same, and programs, for example, to the technology of migrating logical volumes from one storage system to another.

BACKGROUND ART

As a device for a computer to effectively store information required for computing, a storage system is well known. By connecting one or more computers and one or more storage systems to SAN (Storage Area Network), the computer can store information in the storage system.

A storage system is a system including one or more auxiliary storages capable of storing information of HDDs (Hard Disk Drives), SSDs (Solid States Drives) and others permanently which, following information read/write requests from the computer, reads or writes information from or to the auxiliary storages and returns the result to the computer. Furthermore, when reading or writing information from or to the auxiliary storage, the storage system performs the RAID (Redundant Arrays of Independent (or Inexpensive) Disks) processing. RAID is the technology of using multiple storages as one storage for the purpose of improving the reliability and, for the prevention of information loss in case of failure in part of the storage system configuring RAID, of storing information for recovery (parity) in multiple storages. A group of storages that configure RAID is called an RG (RAID group). An area divided into one or more of a storage area of an RG is called a logical volume. The computer requires the logical volume to read or write information.

It is well known that the power consumption of the storage system can be estimated with reference to the access frequency to the RG or the operation rate of HDDs. The access frequency is the number of information read/write requests (I/O requests) to the RG per unit of time. The HDD operation rate is the percentage of the length of time taken since the HDD receives a read or write request till it returns the response in a unit of time.

Meanwhile, according to the Patent Citation 1, the storage system can provide the computer with a virtual logical volume realized by a technology called thin provisioning. A virtual logical volume is similar to a logical volume in that it is an area to store information. However, a virtual logical volume is different from a normal logical volume as, when an information write request is transmitted to a virtual logical volume, a required area in a group of logical volumes called a pool is allocated to the virtual logical volume to which the information write request is transmitted. If an information write request is transmitted to an area to which a virtual logical volume has already been allocated, information is written to the already allocated area. If a request for reading information is transmitted to an area to which a virtual logical volume has already been allocated, information of the already allocated area is returned. If an information read request is transmitted to an area to which no virtual logical volume is allocated, empty information is returned. Since a required number of areas is allocated at the required time by using virtual logical volumes, the utilization efficiency of the auxiliary storage device is improved. Furthermore, the total capacity of logical volumes belonging to a pool can be reduced to be smaller than the total capacity of virtual logical volumes belonging to the same pool.

CITATION LIST

Patent Literature

[PTL 1] Japanese Patent Application Laid-Open Publication No. 2007-293442

SUMMARY OF INVENTION

Technical Problem

However, when a virtual logical volume is used, the number of accesses to an RG to which the logical volumes configuring the pool to which the virtual logical volume belongs belong cannot be calculated with reference to the number of accesses to the virtual logical volume. As a result, the power consumption of a storage system cannot be calculated while that of the normal logical volumes can.

If the power consumption of a storage system cannot be calculated, the capacity of the power supply system of the data center to install the storage system cannot be designed. Furthermore, as most of the power consumption becomes heat, if the power consumption of a storage system cannot be calculated, the capacity of the air conditioning system cannot be designed either. If the capacity of the power supply system and the air conditioning system is designed with reference to the rated power, there will be an excess capacity of the power supply system and the air conditioning system unless the storage system is used at maximum power.

In some cases, due to the limitation of the power supply system of the data center where a storage system is installed, the limit power consumption is specified for each power distribution board or each outlet. In other cases, due to the limitation of the air conditioning system of the data center where a storage system is installed, the limit power consumption is specified for each heating storage system or each rack which installs the storage system. In these cases, if virtual logical volumes are used, the power consumption cannot be calculated. As a result, the data center cannot use virtual logical volumes. Note that limiting the power consumption by setting the upper limit for each power distribution board, each outlet, each chassis and each rack is called power capping. In order to realize such power capping, even if the virtual logical volume belonging to the pool configured of multiple RGs with different chassis and racks is used, the power consumption of each power distribution board, each outlet, each chassis and each rack must be possible to calculate.

Furthermore, the product performance has been significantly improved recently, if auxiliary storage systems are additionally installed during the storage system operation, a logical volume configured of already installed auxiliary storage systems and a logical volume configured of auxiliary storage systems with better performance, larger capacity and higher reliability than that might be in the same pool. In other cases, if a new storage system is installed, both the new one and the older logical volume might be used at the same time. When using a storage system of low reliability, the RAID level is set in order to improve the reliability of the RG. The RAID level shows the means for recovering information so as not to lose the information even if a failure occurs in part of a storage system configuring the RAID. Considering these points, the power consumption must be calculated even if logical volumes each configured of auxiliary storage systems of different types exist in the same pool or if logical volumes belonging to RGs of different RAID levels exist in the same pool.

The present invention is intended in view of such a situation, and provides for the storage technology of being able to calculate (evaluate) the power consumption appropriately even if a virtualized logical volume is used and making migration possible.

Solution to Problem i) For solving the above-mentioned problems, the present invention creates and proposes a migration plan by obtaining the capacity and the number of accesses with reference to the configuration information of the storage systems of the source and the destination, calculating the number of accesses, the capacity increments and the power consumption in case of migration, and determining whether migration is free from the possibility of causing failure.

That is, the storage system of the present invention includes a first storage system including one or more source chassis which provide for a logical volume, a second storage system including one or more destination chassis which provide for a virtual logical volume, and a management computer which considers the logical volume of the first storage system to be a source volume, considers the virtual logical volume of the second storage system to be a destination volume, and controls the processing of migrating the source volume to the destination volume. The first storage system has the source configuration information including the information on the capacity of and the number of accesses to the logical volume, and the second storage system has the destination configuration information including the information on the capacity of and the number of accesses to the virtual logical volume. In such a system, the management computer firstly calculates, by using the source configuration information and the destination configuration information, the increments of accesses and the capacity when the source volume is migrated to the destination volume. Next, the management computer calculates the power consumption value of the destination chassis with reference to a specific formula for the power consumption which is determined by the information including the number of accesses and access increments of the destination volume and the disk device type included in the destination chassis. Furthermore, with reference to the access increments, the capacity increments and the power consumption value of the destination chassis obtained by the calculation, the management computer determines whether the source volume can be migrated to the destination volume, and if the migration is determined to be possible, the management computer is supposed to propose the relevant virtual logical volume as a migration plan. Note that, as more specifically described, the management computer determines that the source volume can be migrated if the power consumption value of the destination chassis is smaller than or equal to the first allowable power consumption value of the relevant destination chassis.

If the first storage system includes multiple logical volumes and the second storage system includes multiple virtual logical volumes, and if prioritizing the power consumption reduction is instructed, the management computer selects the logical volume of the largest capacity as the source volume, and selects the virtual logical volume of the largest capacity as the destination volume. Meanwhile, if prioritizing the prevention of performance deterioration is instructed, the management computer selects the logical volume of the largest number of accesses as the source volume, and selects the virtual logical volume of the largest safety margin of the number of accesses as the destination volume.

Furthermore, the management computer, if it is instructed to migrate the source volume to the destination volume according to the migration plan, performs the migration of the source volume to the destination volume, and then terminates the first storage system including the source volume. While the first storage system is terminated if all the logical volumes in the first storage system are migrated, it may also be permitted to terminate the power supply to the chassis which stores the relevant part of the logical volumes if part of the logical volumes is migrated.

ii) The present invention enables logical volumes to be reconfigured after the migration is performed. That is, after the migration is performed, the management computer calculates the current power consumption value of the destination chassis including the destination volume with reference to the formula for the power consumption value. Then, the management computer determines whether the current power consumption value exceeds the second allowable power consumption value which is larger than the first allowable power consumption value. If the current power consumption value exceeds the second allowable power consumption value, the management computer creates a logical volume migration plan in which the destination volume obtained by the migration processing is considered as a new source volume, and the virtual logical volume which is in the second storage system and is different from the new source volume is considered as a new destination volume. As more specifically described, the management computer calculates, by using the configuration information of the new destination volume obtained from the second storage system, the increments of accesses and the capacity when the new source volume is migrated to the new destination volume. Next, the management computer calculates the power consumption value of the destination chassis with reference to the specific formula for the power consumption which is determined by the information including the number of accesses and access increments of the new destination volume and the disk device type included in the destination chassis. Furthermore, with reference to the access increments, the capacity increments and the power consumption value of the destination chassis obtained by the calculation, the management computer determines whether the new source volume can be migrated to the new destination volume, and if the migration is determined to be possible, the relevant new destination volume is proposed as a migration plan.

Note that, if there are multiple virtual logical volumes that exceed the second allowable power consumption value, they are processed as follows. That is, if prioritizing the power consumption reduction is instructed, the management computer selects the logical volume of the largest capacity among the multiple virtual logical volumes that exceed the second allowable power consumption value as the new source volume, and selects the virtual logical volume of the largest capacity among the multiple virtual logical volumes smaller than or equal to the second allowable power consumption value as the new destination volume. Meanwhile, if prioritizing the prevention of performance deterioration is instructed, the management computer selects the logical volume of the largest number of accesses among the multiple virtual logical volumes that exceed the second allowable power consumption value as the new source volume, and selects the virtual logical volume of the largest safety margin of the number of accesses among the multiple virtual logical volumes smaller than or equal to the second allowable power consumption value as the new destination volume.

iii) Furthermore, after the migration is performed, in the second storage system including multiple virtual logical volumes, if changing the setting is instructed between the first setting of prioritizing the power consumption reduction and the second setting of prioritizing the prevention of performance deterioration, the processing is as follows. That is, in response to the instruction of the setting change, the management computer selects the logical volume to be changed and the change destination logical volume which is the destination of the relevant logical volume to be changed. Then, the management computer calculates the power consumption value after the setting change with reference to the increments of accesses and the capacity when changing to the destination logical volume and the specific formula for the power consumption. Furthermore, the management computer compares the power consumption value after the setting change with the first allowable power consumption value, and determines if the setting change is possible.

As more specifically described, if changing from the first setting to the second setting is instructed, the management computer selects the logical volume of the largest capacity in the pool of the largest capacity among the multiple pools of virtual logical volumes as the logical volume to be changed, and selects the logical volume in the pool of the smallest capacity as the change destination logical volume.

Meanwhile, if changing from the second setting to the first setting is instructed, the management computer selects the logical volume of the largest number of accesses in the pool with the smallest number of empty accesses among the multiple pools of virtual logical volumes as the logical volume to be changed, and selects the logical volume in the pool with the largest number of empty accesses as the change destination logical volume.

Further characteristics of the present invention are disclosed by the following best modes for carrying out the invention and the attached figures.

Advantageous Effects of Invention

The present invention enables the calculation of a storage system's power consumption for each storage system which supplies power to the storage system, and the use of a storage system without exceeding the storage system's limit power consumption.

BRIEF DESCRIPTION OF DRAWINGS

FIG. 12 is a diagram showing the contents of chassis information of a storage system by this embodiment.

FIG. 13 is a diagram (1) showing the contents of HDD information by this embodiment.

FIG. 14 is a diagram (2) showing the contents of HDD information by this embodiment.

FIG. 15 is a diagram showing the contents of RG information by this embodiment.

FIG. 16 is a diagram showing the contents of logical volume information by this embodiment.

FIG. 17 is a diagram showing the contents of POWER CONSUMPTION INFORMATION 1105 by this embodiment.

FIG. 18 is a diagram showing the contents of pool information by this embodiment.

FIG. 19 is a diagram showing the contents of virtual logical volume creation plan information by this embodiment.

FIG. 20 is a diagram showing the contents of virtual logical volume allocation plan information by this embodiment.

FIG. 21 is a diagram showing the pool threshold by this embodiment.

FIG. 22 is a diagram showing the contents of external logical volume information by this embodiment.

DESCRIPTION OF EMBODIMENTS

The present invention relates to a technology of migrating a logical volume in a storage system to a virtual logical volume in another storage system. For migration, the power consumption of a destination storage system is estimated, and the logical volume is migrated while keeping the power consumption from exceeding the previously specified value.

An embodiment for the present invention is described below with reference to the attached figures. However, it should be noted that this embodiment is only an example for realizing this invention and does not limit the technical range of this invention. Furthermore, in each figure, the same numeral is given to the common configuration.

System Configuration

Figure 1:
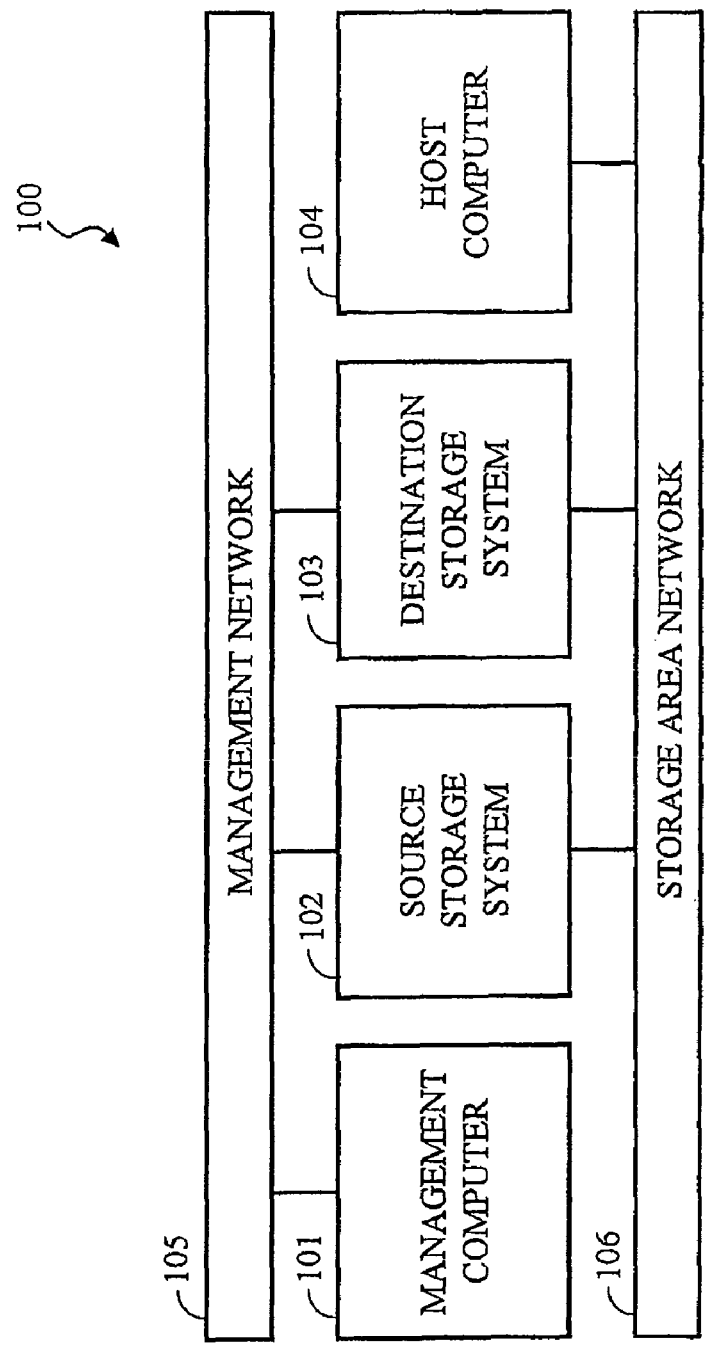
FIG. 1 is a diagram showing the general configuration of a storage system by this embodiment.

FIG. 1 is a diagram showing the general configuration of a storage system by this embodiment.

This storage system 100 includes a MANAGEMENT COMPUTER 101, a SOURCE STORAGE SYSTEM 102, a DESTINATION STORAGE SYSTEM 103, a HOST COMPUTER 104, a MANAGEMENT NETWORK 105 and a STORAGE AREA NETWORK 106. The MANAGEMENT COMPUTER 101, the SOURCE STORAGE SYSTEM 102 and the DESTINATION STORAGE SYSTEM 103 are connected with each other via the MANAGEMENT NETWORK 105. Furthermore, the SOURCE STORAGE SYSTEM 102, the DESTINATION STORAGE SYSTEM 103 and the HOST COMPUTER 104 are connected with each other via the STORAGE AREA NETWORK 106.

The MANAGEMENT COMPUTER 101 is a management computer which obtains the configuration information from the SOURCE STORAGE SYSTEM 102 and the DESTINATION STORAGE SYSTEM 103, creates a logical volume migration plan with reference to the configuration information, transmits a command for logical volume migration to the SOURCE STORAGE SYSTEM 102 and the DESTINATION STORAGE SYSTEM 103, and transmits a power off command to the 102.

The SOURCE STORAGE SYSTEM 102 is a storage system including one or more logical volumes to store information read or written by the HOST COMPUTER 104.

The DESTINATION STORAGE SYSTEM 103 is a storage system including one or more logical volumes to store information read or written by the HOST COMPUTER 104. The HOST COMPUTER 104 is a host computer which writes information to or reads information from the SOURCE STORAGE SYSTEM 102 and the DESTINATION STORAGE SYSTEM 103, and executes business applications.

The MANAGEMENT NETWORK 105 is a management network for the management computer and the storage system to communicate with each other such as obtaining configuration information and transmitting logical volume migration commands, and Ethernet (Trademark) corresponds with this, for example.

The STORAGE AREA NETWORK 106 is a network for the host computer and the storage system to communicate with each other such as information on business applications, and Fibre Channel corresponds with this, for example.

This embodiment describes the present invention by an example in which the SOURCE STORAGE SYSTEM 102 is considered as a source storage system, the DESTINATION STORAGE SYSTEM 103 is considered as a destination storage system, and all the logical volumes stored in the source storage system are migrated to the destination storage system. However, the present invention applies not only to the migration of all the logical volumes in the source storage system to the destination storage system but also to the migration of part of logical volumes included also in the source storage system to the destination storage system.

Configuration of the Source Storage System

Figure 2:
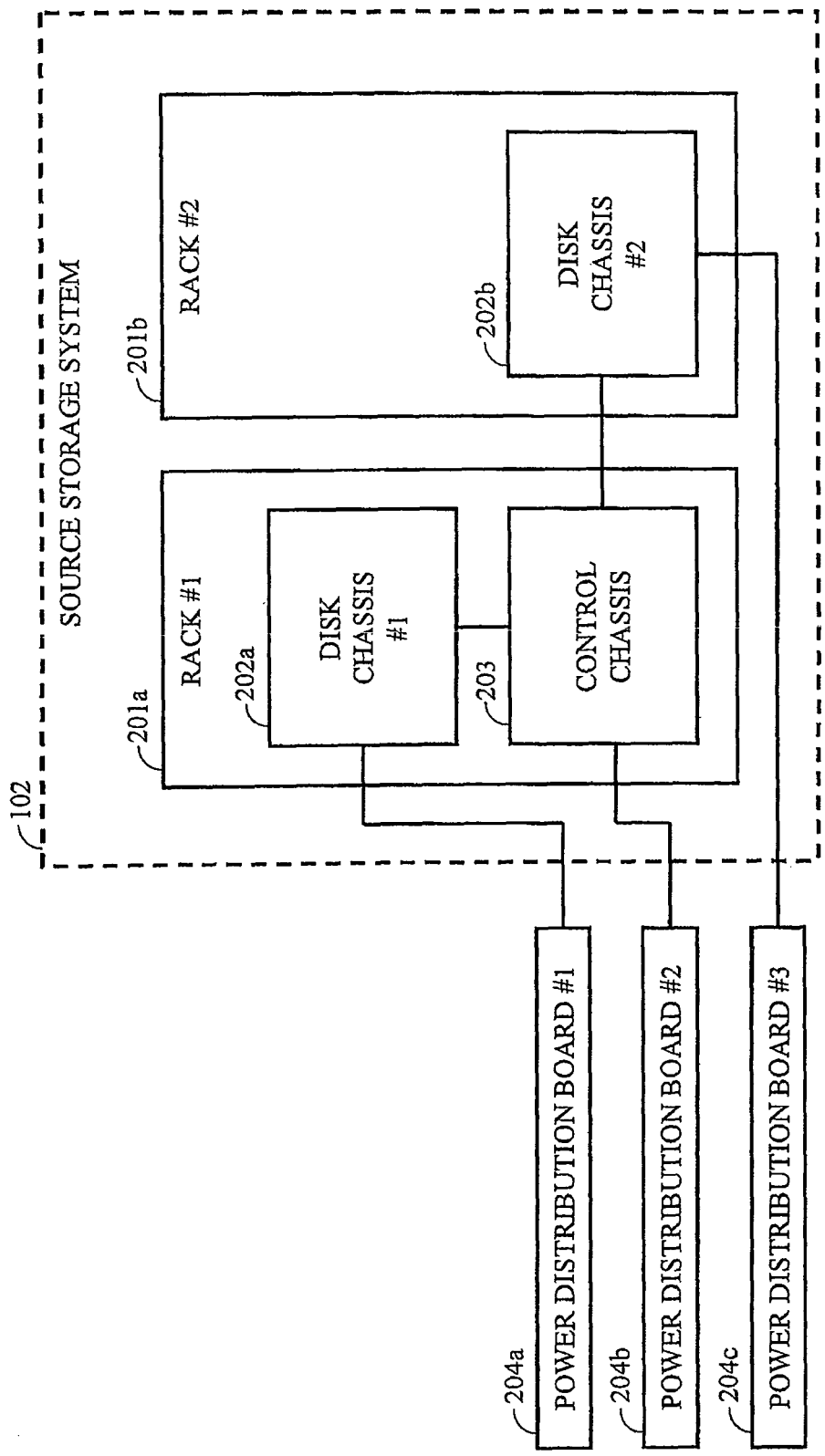
FIG. 2 is a diagram showing the general configuration of a SOURCE STORAGE SYSTEM 102 by this embodiment.

FIG. 2 is a diagram showing the general configuration of a SOURCE STORAGE SYSTEM 102 by this embodiment. The SOURCE STORAGE SYSTEM 102 includes, for example, a RACK #1_201a and a RACK #2_201b inside.

The RACK #1_201a is a rack for installing a chassis such as a DISK CHASSIS #1_202a. In the RACK #1_201a, the DISK CHASSIS #1_202a and the CONTROL CHASSIS 203 are installed.

The RACK #2_201b is a rack for installing a chassis such as a DISK CHASSIS #2_202b. In the RACK #2_201b, the DISK CHASSIS #2_202b is installed.

The DISK CHASSIS #1_202a is a chassis installing a device for storing the information read or written by the HOST COMPUTER 104. The DISK CHASSIS #1_202a is connected with the POWER DISTRIBUTION BOARD #1_204a.

The DISK CHASSIS #2_202b is a chassis installing a device for storing the information read or written by the HOST COMPUTER 104. The DISK CHASSIS #2_202b is connected with the POWER DISTRIBUTION BOARD #3204c.

The CONTROL CHASSIS 203 is a chassis installing a device for storing the information read or written by the HOST COMPUTER 104 and a device which receives read commands and write commands transmitted by the HOST COMPUTER 104, and transmits the results. The CONTROL CHASSIS 203 is connected with the POWER DISTRIBUTION BOARD #2_204b.

The POWER DISTRIBUTION BOARD #1_204a is a power distribution board which supplies power to the DISK CHASSIS #1_202a.

The POWER DISTRIBUTION BOARD #2_204b is a power distribution board which supplies power to the CONTROL CHASSIS 203.

The POWER DISTRIBUTION BOARD #3_204c is a power distribution board which supplies power to the DISK CHASSIS #2_202b.

Configuration of the Destination Storage System

Figure 3:
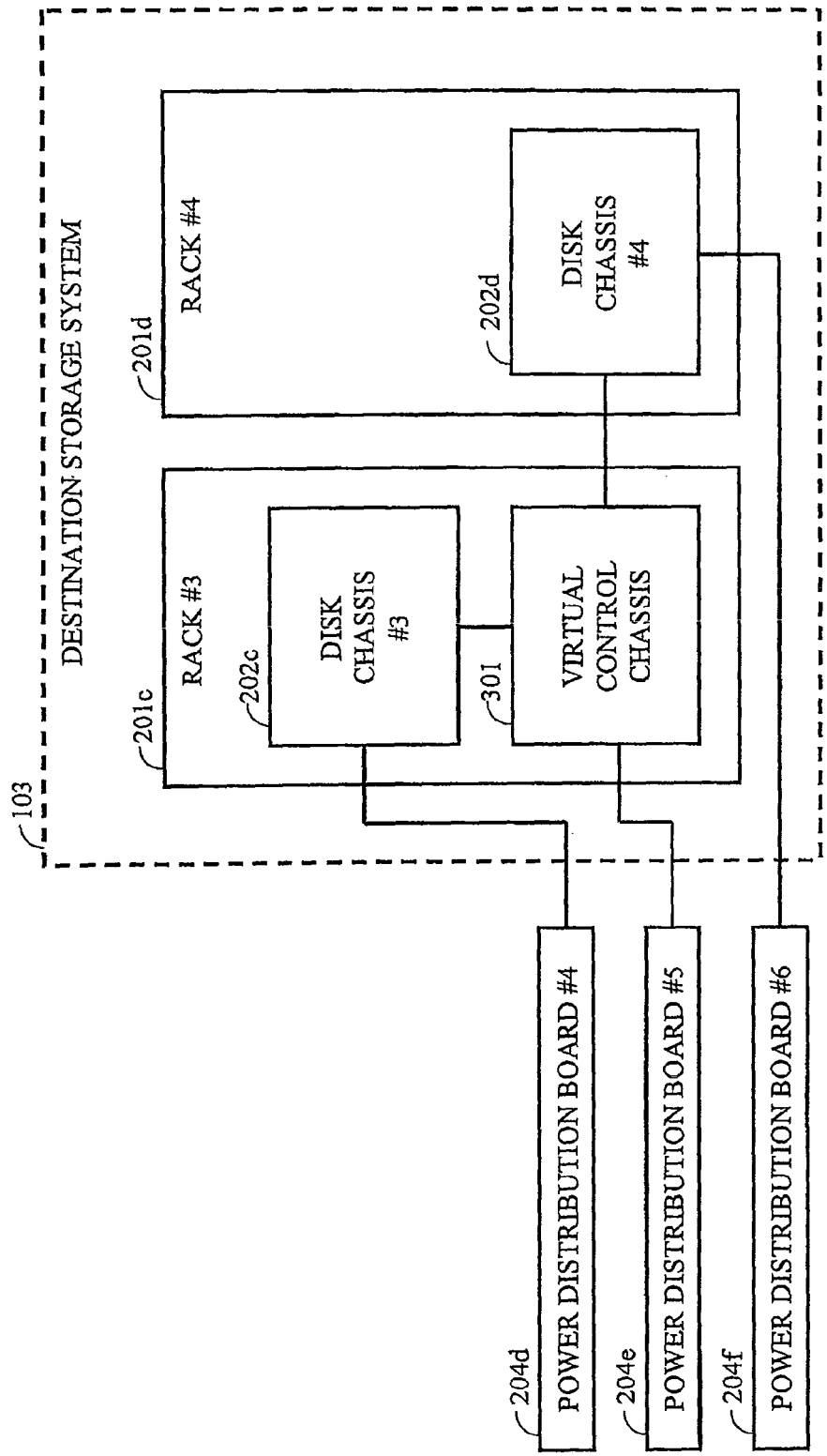
FIG. 3 is a diagram showing the general configuration of a DESTINATION STORAGE SYSTEM 103 by this embodiment.

FIG. 3 is a diagram showing the configuration of a DESTINATION STORAGE SYSTEM 103 by this embodiment. The DESTINATION STORAGE SYSTEM 103 includes, for example, a RACK #3_201c and a RACK #4_201d inside.

The RACK #3_201c is a rack for installing a chassis such as a DISK CHASSIS #3_202c. In the RACK #3_201c, the DISK CHASSIS #3_202c and the VIRTUAL CONTROL CHASSIS 301 are installed.

The RACK #4_201d is a rack for installing a chassis such as a DISK CHASSIS #4_202d. In the RACK #4_201d, the DISK CHASSIS #4_202d is installed.

The DISK CHASSIS #3_202c is a chassis installing a device for storing the information read or written by the HOST COMPUTER 104. The DISK CHASSIS #3_202c is connected with the POWER DISTRIBUTION BOARD #4_204d.

The DISK CHASSIS #4_202d is a chassis installing a device for storing the information read or written by the HOST COMPUTER 104. The DISK CHASSIS #4_202d is connected with the POWER DISTRIBUTION BOARD #6_204f.

The VIRTUAL CONTROL CHASSIS 301 is a chassis installing a device for storing the information read or written by the HOST COMPUTER 104 and a device which receives read commands and write commands transmitted by the HOST COMPUTER 104, and transmits the results. The VIRTUAL CONTROL CHASSIS 301 is connected with the POWER DISTRIBUTION BOARD #5_204e.

The POWER DISTRIBUTION BOARD #4_204d is a power distribution board which supplies power to the DISK CHASSIS #3_202c.

The POWER DISTRIBUTION BOARD #5_204e is a power distribution board which supplies power to the VIRTUAL CONTROL CHASSIS 301.

The POWER DISTRIBUTION BOARD #6_204f is a power distribution board which supplies power to the DISK CHASSIS #4_202d.

Configuration of the CONTROL CHASSIS

Figure 4:
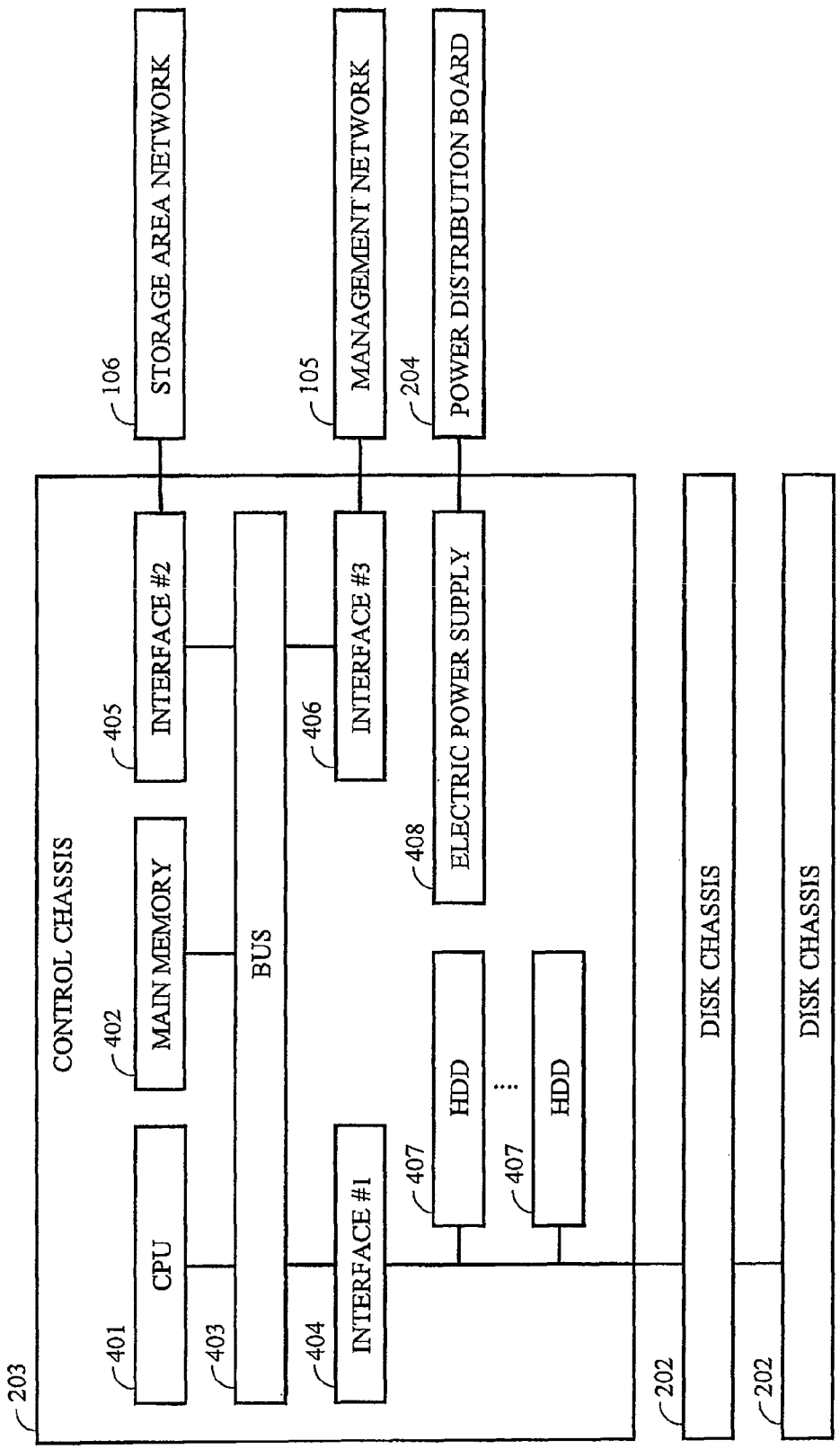
FIG. 4 is a diagram showing the general configuration of a CONTROL CHASSIS 203 by this embodiment.

FIG. 4 is a diagram showing the general configuration of a CONTROL CHASSIS 203 by this embodiment. The CONTROL CHASSIS 203 includes a CPU (Central Processing Unit) 401, a MAIN MEMORY 402, a BUS 403, an INTERFACE #1_404, an INTERFACE #2_405, an INTERFACE #3_406, a Hard Disk Drive (HDD) 407, and an ELECTRIC POWER SUPPLY 408 inside. The CPU 401, the MAIN MEMORY 402, the INTERFACE #1_404, the INTERFACE #2_405 and the INTERFACE #3_406 are connected with each other via the BUS 403.

The CPU 401 is a central processing unit which executes the programs stored in the MAIN MEMORY 402.

The MAIN MEMORY 402 is a main memory for storing the programs executed by the CPU 401.

The INTERFACE #1_404 is an interface for connecting the BUS 403, with the HDD 407, and the HDD 407 installed in the DISK CHASSIS 202.

The INTERFACE #2_405 is an interface for connecting the BUS 403 with the STORAGE AREA NETWORK 106.

The INTERFACE #3_406 is an interface for connecting the BUS 403 with the MANAGEMENT NETWORK 105.

The HDD 407 is a hard disk drive for storing information. The HDD 407 can be any auxiliary storage device, including an SSD (Solid State Drive).

The ELECTRIC POWER SUPPLY 408 is an electric power supply connected with the POWER DISTRIBUTION BOARD 204 and supplies power to the devices which configure the CONTROL CHASSIS 203.

Configuration of the VIRTUAL CONTROL CHASSIS

Figure 5:
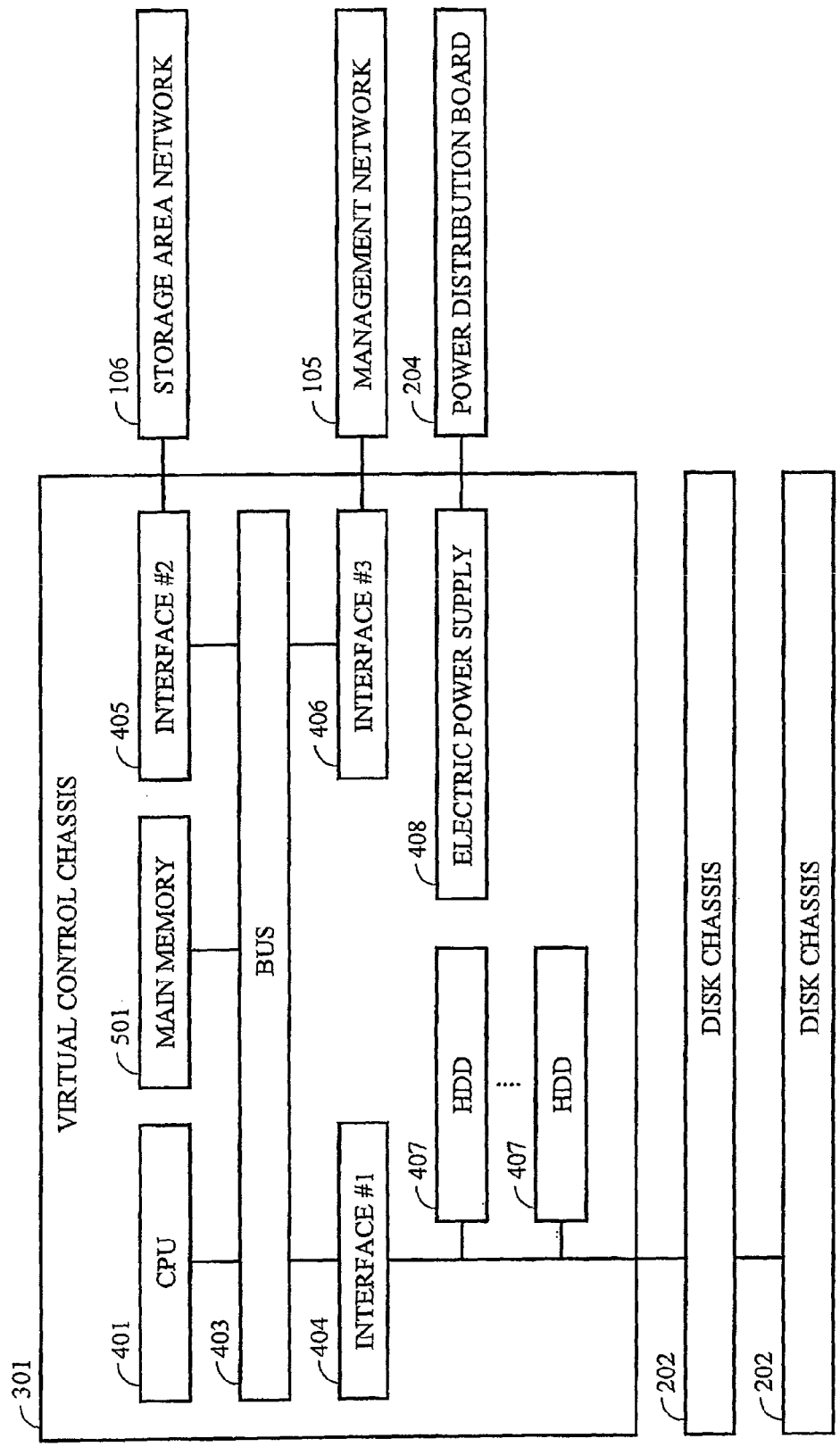
FIG. 5 is a diagram showing the general configuration of a VIRTUAL CONTROL CHASSIS 301 by this embodiment.

FIG. 5 is a diagram showing the general configuration of a VIRTUAL CONTROL CHASSIS 301 by this embodiment.

The VIRTUAL CONTROL CHASSIS 301 includes a CPU 401, a MAIN MEMORY 501, a BUS 403, an INTERFACE #1_404, an INTERFACE #2_405, an INTERFACE #3_406, an HDD 407 and an ELECTRIC POWER SUPPLY 408. The configuration of the VIRTUAL CONTROL CHASSIS 301 is the same as the configuration of the CONTROL CHASSIS 203 except for the information stored in the MAIN MEMORY 501.

The MAIN MEMORY 501 is a main memory for storing the programs executed by the CPU 401.

Configuration of the DISK CHASSIS

Figure 6:
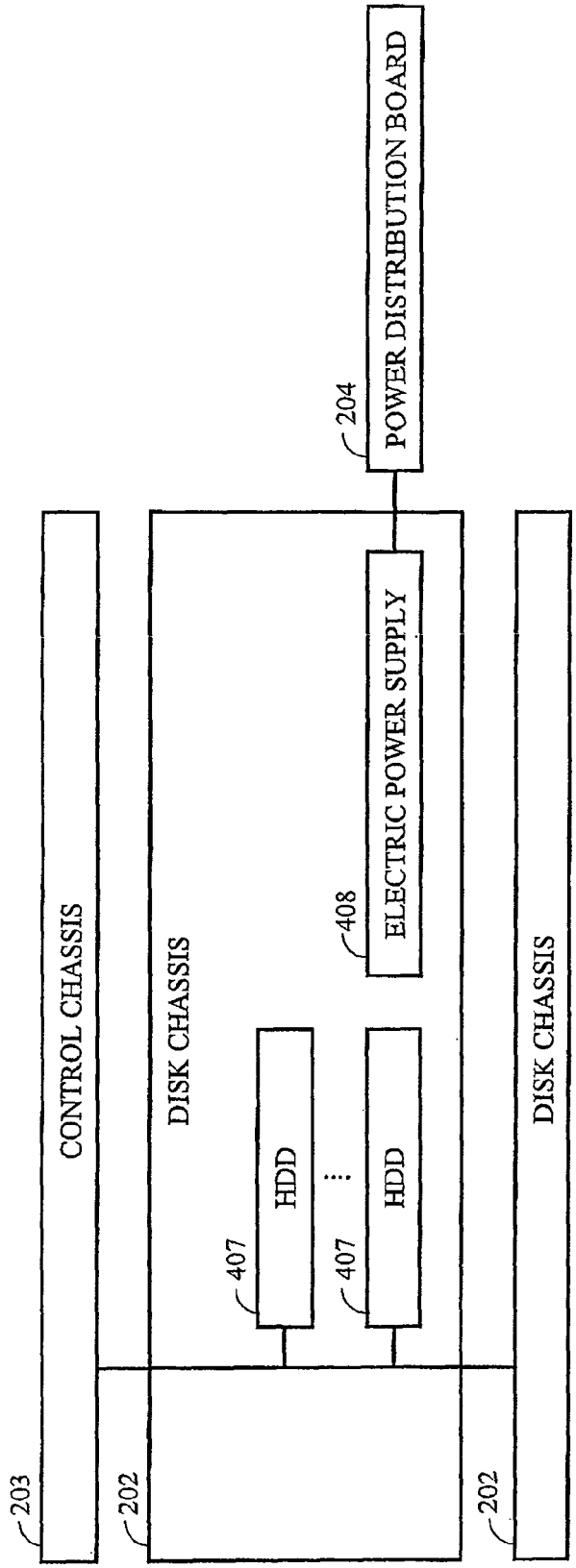
FIG. 6 is a diagram showing the general configuration of a DISK CHASSIS 202 by this embodiment.

FIG. 6 is a diagram showing the general configuration of a DISK CHASSIS 202 by this embodiment.

The DISK CHASSIS 202 includes an HDD 407 and an ELECTRIC POWER SUPPLY 408. The HDD 407 is connected with the INTERFACE #1_404 installed in the CONTROL CHASSIS 203 or the VIRTUAL CONTROL CHASSIS 301.

Configuration of the MANAGEMENT COMPUTER

Figure 7:
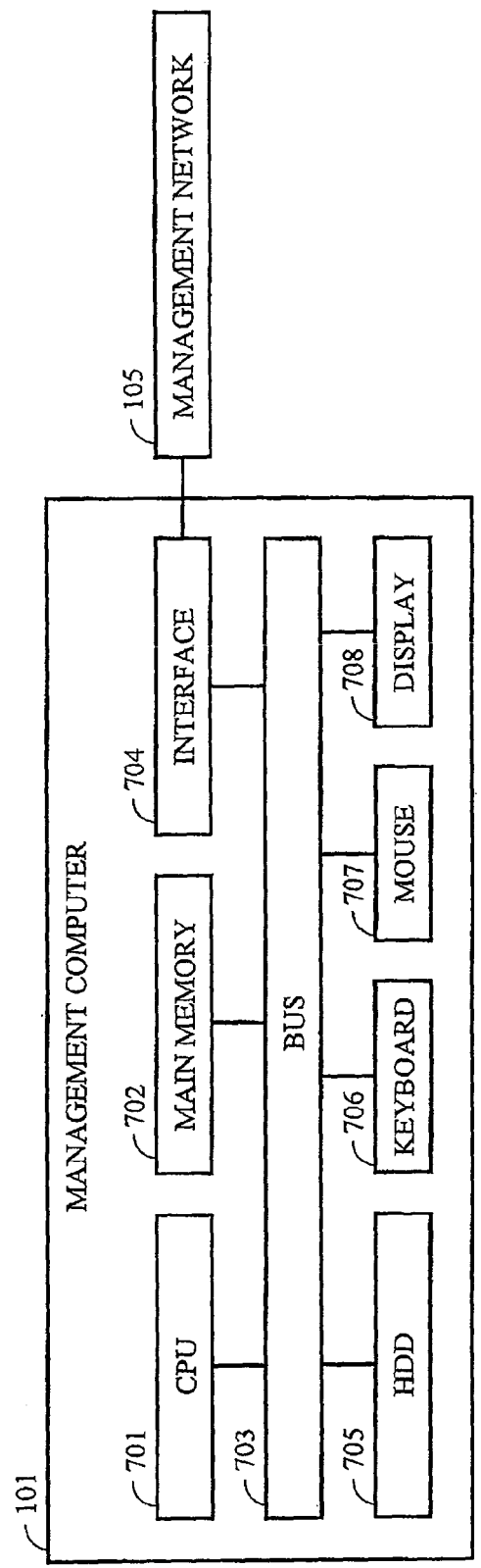
FIG. 7 is a diagram showing the general configuration of a MANAGEMENT COMPUTER 101 by this embodiment.

FIG. 7 is a diagram showing the general configuration of a MANAGEMENT COMPUTER 101 by this embodiment.

The MANAGEMENT COMPUTER 101 includes a CPU 701, a MAIN MEMORY 702, a BUS 703, an INTERFACE 704, an HDD 705, a KEYBOARD 706, a MOUSE 707, and a DISPLAY 708. The CPU 701, the MAIN MEMORY 702, the INTERFACE 704, the HDD 705, the KEYBOARD 706, the MOUSE 707, and the DISPLAY 708 are connected with each other via the BUS 703.

The CPU 701 is a central processing unit which executes the programs stored in the MAIN MEMORY 702.

The MAIN MEMORY 702 is a main memory for storing stores the programs executed by the CPU 701.

The INTERFACE 704 is an interface for connecting the BUS 403 with the MANAGEMENT NETWORK 105.

The HDD 705 is a hard disk drive for storing information. The HDD 705 can be any auxiliary storage device which can store the information permanently, including an SSD.

The KEYBOARD 706 is a keyboard for the operation administrator to enter characters on the administration screen.

The MOUSE 707 is a mouse for the operation administrator to control the cursor on the administration screen. The MOUSE 707 can be any pointing device with which the cursor on the administration screen can be controlled, including a touchpad and a trackball. If the operation administrator can control the cursor on the administration screen by using the KEYBOARD 706, the MOUSE 707 is not required.

The DISPLAY 708 is a display for the operation administrator to see the administration screen.

Configuration of the HOST COMPUTER

Figure 8:
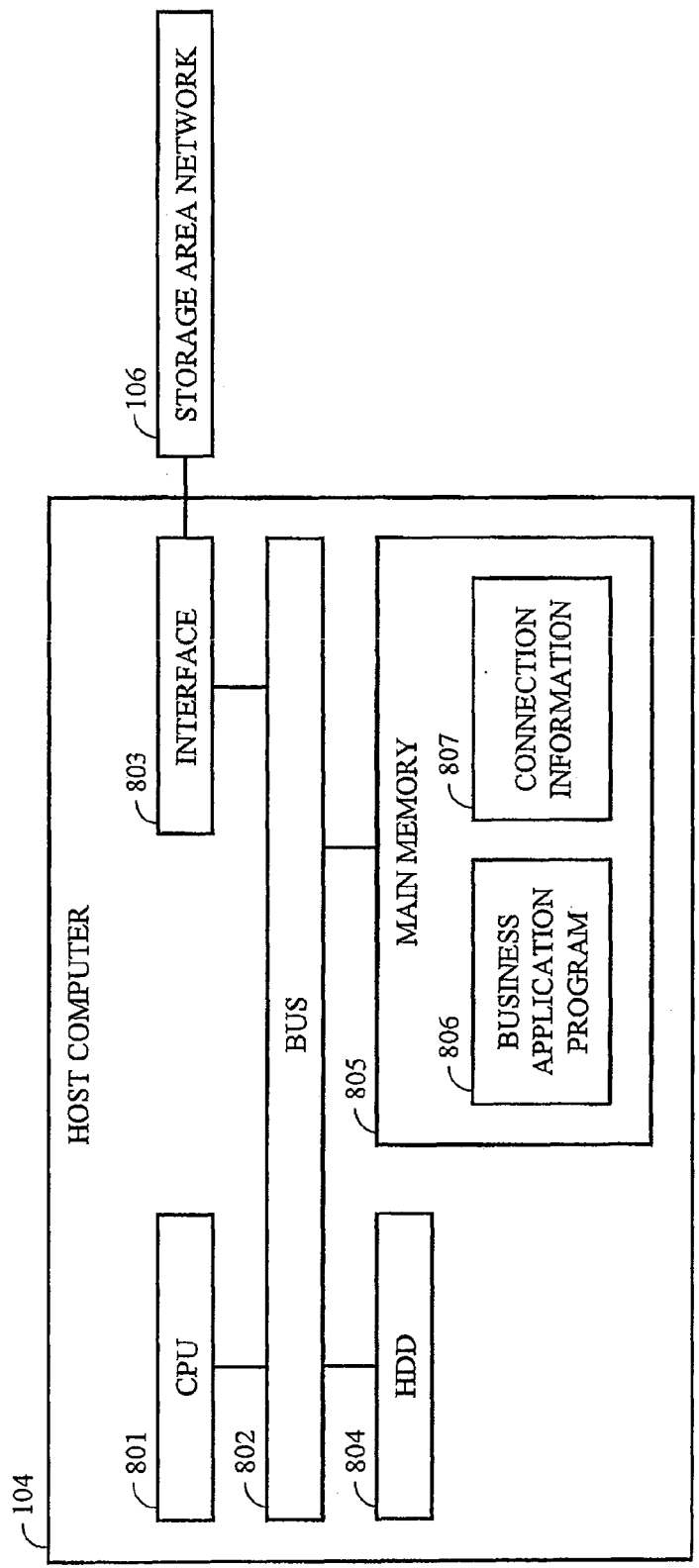
FIG. 8 is a diagram showing the general configuration of a HOST COMPUTER 104 by this embodiment.

FIG. 8 is a diagram showing the general configuration of a HOST COMPUTER 104 by this embodiment.

The HOST COMPUTER 104 includes a CPU 801, a BUS 802, an INTERFACE 803, an HDD 804, a MAIN MEMORY 805, a BUSINESS APPLICATION PROGRAM 806, and a CONNECTION INFORMATION 807. The CPU 801, the INTERFACE 803, the HDD 804 and the MAIN MEMORY 805 are connected with each other via the BUS 802.

The CPU 801 is a central processing unit which executes the programs stored in the MAIN MEMORY 805.

The INTERFACE 803 is an interface for connecting the BUS 802 with the STORAGE AREA NETWORK 106.

The HDD 804 is a hard disk drive for storing information. The HDD 804 can be any auxiliary storage device which can store the information permanently, including an SSD.

The MAIN MEMORY 805 is a main memory for storing the programs executed by the CPU 801. In the MAIN MEMORY 805, a BUSINESS APPLICATION PROGRAM 806 and a CONNECTION INFORMATION 807 are stored.

The BUSINESS APPLICATION PROGRAM 806 and the CONNECTION INFORMATION 807 are stored in the HDD 804 and, when the HOST COMPUTER 104 is booted, the CPU 801 copies the BUSINESS APPLICATION PROGRAM 806 and the CONNECTION INFORMATION 807 to the MAIN MEMORY 805.

The BUSINESS APPLICATION PROGRAM 806 is a business application program for example, used for payroll accounting. The BUSINESS APPLICATION PROGRAM 806 reads information from and writes information to the SOURCE STORAGE SYSTEM 102 and the DESTINATION STORAGE SYSTEM 103, following the connection information of the CONNECTION INFORMATION 807, via the STORAGE AREA NETWORK 106.

The CONNECTION INFORMATION 807 is the storage system information read or written by the BUSINESS APPLICATION PROGRAM 806. The CONNECTION INFORMATION 807, as more specifically described, a value for uniquely identifying the storage system (WWN (World Wide Name)) and a value for uniquely identifying the logical volume (Logical Unit Number).

Contents of the MAIN MEMORY 402

Figure 9:
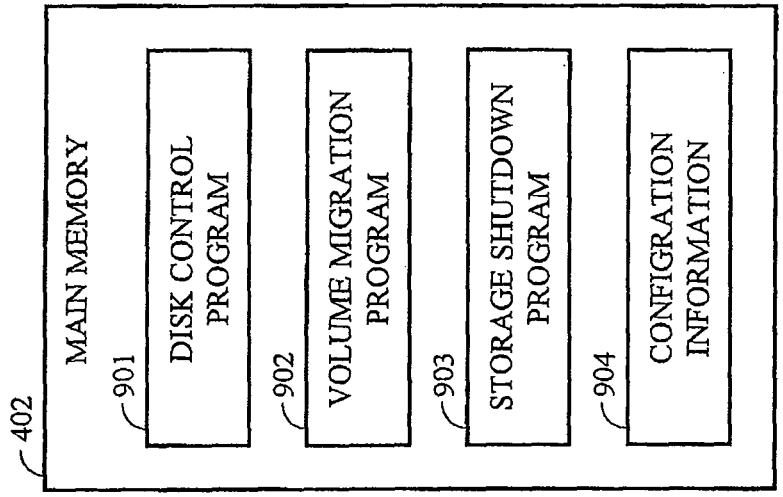
FIG. 9 is a diagram showing the configuration of a MAIN MEMORY 402 by this embodiment.

FIG. 9 is a diagram showing the configuration of a MAIN MEMORY 402 in the CONTROL CHASSIS 203 by this embodiment.

The MAIN MEMORY 402 stores a DISK CONTROL PROGRAM 901, a VOLUME MIGRATION PROGRAM 902, a STORAGE SHUTDOWN PROGRAM 903 and a CONFIGURATION INFORMATION 904.

The DISK CONTROL PROGRAM 901 is a disk control program which, according to read requests and write requests transmitted by the HOST COMPUTER 104 to a logical volume, reads information from and writes information to the HDD 407 in the CONTROL CHASSIS 203 or to the HDD 407 in the CONTROL CHASSIS 203 directly connected to the CONTROL CHASSIS 203, and responds to the HOST COMPUTER 104.

The DISK CONTROL PROGRAM 901 performs RAID processing when reading information from or writing information to the HDD 407. RAID is the technology of using multiple storages as one storage for the purpose of improving the reliability and, for the prevention of information loss in case of failure in part of the storage system configuring RAID, of storing information for recovery in multiple storages. A group of storages configuring RAID is called an RG (RAID group). One or more areas divided from a storage area of an RG are called logical volumes.

The VOLUME MIGRATION PROGRAM 902 is a volume migration program of migrating a logical volume to a logical volume in the same storage system or to a logical volume in another storage system.

The STORAGE SHUTDOWN PROGRAM 903 is a program of powering off the HDD 407 and the devices in the SOURCE STORAGE SYSTEM 102 including the DISK CHASSIS 202.

The CONFIGURATION INFORMATION 904 is the configuration information of the SOURCE STORAGE SYSTEM 102.

Contents of the MAIN MEMORY 501

Figure 10:
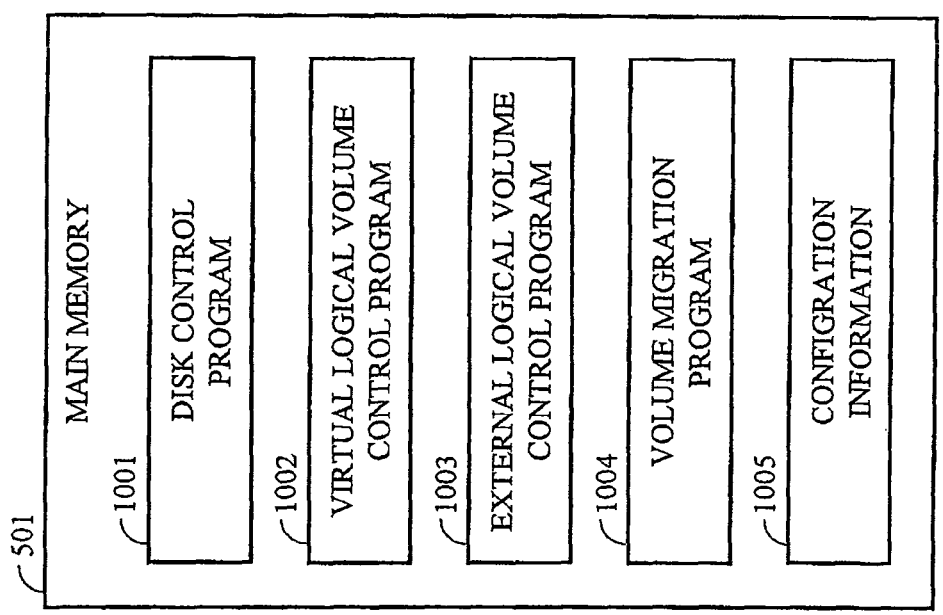
FIG. 10 is a diagram showing the configuration of a MAIN MEMORY 501 by this embodiment.

FIG. 10 is a diagram showing the configuration of a MAIN MEMORY 501 in the VIRTUAL CONTROL CHASSIS 301 by this embodiment.

The MAIN MEMORY 501 stores a DISK CONTROL PROGRAM 1001, a VIRTUAL LOGICAL VOLUME CONTROL PROGRAM 1002, an EXTERNAL LOGICAL VOLUME CONTROL PROGRAM 1003, a VOLUME MIGRATION PROGRAM 1004 and a CONFIGURATION INFORMATION 1005.

The DISK CONTROL PROGRAM 1001 is a disk control program which, according to read requests and write requests transmitted by the HOST COMPUTER 104 to a logical volume, reads information from and writes information to the HDD 407 in the VIRTUAL CONTROL CHASSIS 301 or to the HDD 407 in the DISK CHASSIS 202 directly connected to the VIRTUAL CONTROL CHASSIS 301, and responds to the HOST COMPUTER 104. The DISK CONTROL PROGRAM 1001 performs RAID processing when reading information from or writing information to the HDD 407.

The VIRTUAL LOGICAL VOLUME CONTROL PROGRAM 1002 is a virtual logical volume control program which, according to read requests and write requests transmitted by the HOST COMPUTER 104 to a virtual logical volume, reads information from and writes information to the HDD 407 in the VIRTUAL CONTROL CHASSIS 301 or to the HDD 407 in the DISK CHASSIS 202 directly connected to the VIRTUAL CONTROL CHASSIS 301, and responds to the HOST COMPUTER 104. Note that a virtual logical volume is realized by a technology called thin provisioning. A virtual logical volume is similar to a logical volume in that it is an area to store information, though it is different from a normal logical volume as, when an information write request is transmitted to a virtual logical volume, a required area in a group of logical volumes called a pool is allocated to the virtual logical volume to which the information write request is transmitted. If an information write request is transmitted to an area to which a virtual logical volume has already been allocated, information is written to the already allocated area. If an information read request is transmitted to an area to which a virtual logical volume has already been allocated, information of the already allocated area is returned. If an information read request is transmitted to an area to which no virtual logical volume is allocated, empty information is returned. The correspondence of the area of a virtual logical volume with the area of a logical volume for actual information read/write is shown in FIG. 20. Since a required number of areas are allocated at a required time by using virtual logical volumes, the utilization efficiency of the auxiliary storage device is improved. Furthermore, the total capacity of logical volumes belonging to a pool can be reduced to be smaller than the total capacity of virtual logical volumes that belonging to the same pool.

The EXTERNAL LOGICAL VOLUME CONTROL PROGRAM 1003 is an external logical volume control program which, according to read requests and write requests transmitted by the HOST COMPUTER 104 to an external logical volume, reads information from and writes information to the HDD 407 in the CONTROL CHASSIS 203 or to the HDD 407 in the DISK CHASSIS 202 directly connected to the CONTROL CHASSIS 203, and responds to the HOST COMPUTER 104. An external logical volume is similar to a logical volume in that it is an area to store information, though it is different from a normal logical volume as, when an information read/write request is transmitted to an external logical volume, it reads information from or writes information to the logical volume in another storage system and return the results. The correspondence of an external logical volume with a logical volume for actual information read/write is shown in FIG. 22. By using external logical volumes, it appears to the HOST COMPUTER 104 that the logical volumes stored in the SOURCE STORAGE SYSTEM 102 are stored in the DESTINATION STORAGE SYSTEM 103.

The VOLUME MIGRATION PROGRAM 1004 is a volume migration program of migrating a logical volume to a logical volume in the same storage device or to a logical volume in another storage device.

The CONFIGURATION INFORMATION 1005 is the configuration information of the DESTINATION STORAGE SYSTEM 103.

Contents of the MAIN MEMORY 702

Figure 11:
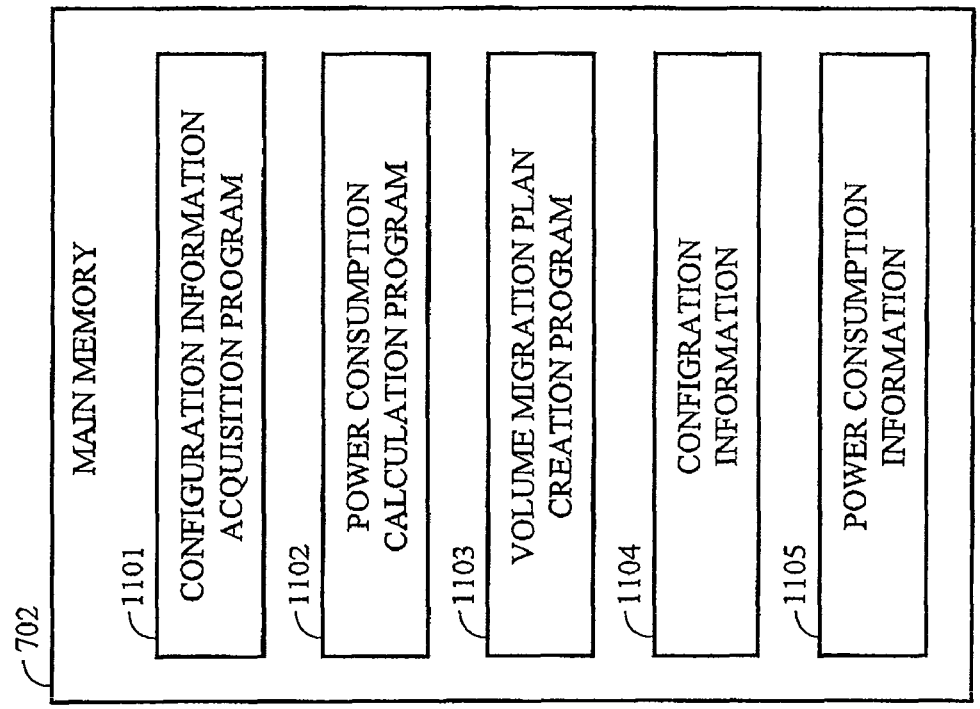
FIG. 11 is a diagram showing the configuration of a MAIN MEMORY 702 by this embodiment.

FIG. 11 is a diagram showing the configuration of a MAIN MEMORY 702 in the MANAGEMENT COMPUTER 101 by this embodiment.

The MAIN MEMORY 702 stores a CONFIGURATION INFORMATION ACQUISITION PROGRAM 1101, a POWER CONSUMPTION CALCULATION PROGRAM 1102, a VOLUME MIGRATION PLAN CREATION PROGRAM 1103, CONFIGURATION INFORMATION 1104 and POWER CONSUMPTION INFORMATION 1105.

The CONFIGURATION INFORMATION ACQUISITION PROGRAM 1101 is a configuration information acquisition program which obtains the CONFIGURATION INFORMATION 904 from the SOURCE STORAGE SYSTEM 102 and the CONFIGURATION INFORMATION 1005 from the DESTINATION STORAGE SYSTEM 103, and stores them in the CONFIGURATION INFORMATION 1104.

The POWER CONSUMPTION CALCULATION PROGRAM 1102 is a power consumption calculation program of calculating the power consumption of the SOURCE STORAGE SYSTEM 102 and the 103 based on the configuration information obtained by the CONFIGURATION INFORMATION ACQUISITION PROGRAM 1101.

The VOLUME MIGRATION PLAN CREATION PROGRAM 1103 is a program of creating a logical volume migration plan for migrating a logical volume stored in the SOURCE STORAGE SYSTEM 102 to the DESTINATION STORAGE SYSTEM 103.

The CONFIGURATION INFORMATION 1104 is the configuration information of the SOURCE STORAGE SYSTEM 102 and the DESTINATION STORAGE SYSTEM 103 obtained by the CONFIGURATION INFORMATION ACQUISITION PROGRAM 1101.

The POWER CONSUMPTION INFORMATION 1105 is the information for calculating the power consumption of the SOURCE STORAGE SYSTEM 102 and the DESTINATION STORAGE SYSTEM 103.

Chassis Information of the Storage System

FIG. 12 is a diagram showing the chassis information 1201 of a storage system which is a part of the CONFIGURATION INFORMATION 1104.

The column 1202 shows the device where the configuration information is obtained. The row with "SOURCE" in the column 1202 is the chassis information of the source storage system, and the row with "DESTINATION" in the column 1202 is the chassis information of the destination storage system.

The column 1203 is an identifier for uniquely identifying the chassis. For example, the "DISK CHASSIS #1" belongs to the source storage system.

The column 1204 is an identifier for uniquely identifying the power distribution board which supplies power to the chassis. For example, the "DISK CHASSIS #1" is supplied with power by the "POWER DISTRIBUTION BOARD #1."

The column 1205 is the limit power consumption that can be supplied by the power distribution board. This value is specified in advance for each power distribution board.

The column 1206 is the rate of the maximum power consumption in creating a logical volume migration plan to the limit power consumption in the column 1205. For example, for a chassis connected to the "POWER DISTRIBUTION BOARD #1," a logical volume is placed with the power consumption of 3,000 W×70%=2,100 W or less.

The column 1207 is the optimization threshold of the logical volume placement after the logical volume migration, and it is the rate to the limit power consumption in the column 1205. For example, a chassis connected to the "POWER DISTRIBUTION BOARD #1" exceeds 3,000 W×90%=2,700 W, the logical volume placement is to be optimized. That is, re-optimization is not immediately performed if the value exceeds 70%, while the logical volume placement is optimized again if the value exceeds 90%.

The columns 1202, 1205, 1206 and 1207 are the information provided when the CONFIGURATION INFORMATION ACQUISITION PROGRAM 1101 obtains information from the CONFIGURATION INFORMATION 904 or the CONFIGURATION INFORMATION 1005. Furthermore, the columns 1203 and 1204 are the information obtained by the CONFIGURATION INFORMATION ACQUISITION PROGRAM 1101 from the CONFIGURATION INFORMATION 904 or the CONFIGURATION INFORMATION 1005.

Contents of HDD Information

FIGS. 13 and 14 are the diagrams showing the contents of HDD information (Table 1301) which is part of the CONFIGURATION INFORMATION 1104. Though FIGS. 13 and 14 are shown separately due to the space limitation, they are connected actually and comprise one table.

The column 1302 shows the device where the configuration information is obtained. The row with "SOURCE" in the column 1302 is the HDD information of the source storage system, and the row with "DESTINATION" in the column 1302 is the HDD information of the destination storage system.

The column 1303 is an identifier for uniquely identifying the HDD. For example, the "HDD #1" belongs to the source storage system.

The column 1304 is an identifier for uniquely identifying the chassis where the HDD is installed. For example, the "HDD #1" is installed in the "CONTROL CHASSIS."

The column 1305 is an identifier for uniquely identifying the RG to which the HDD belongs. For example, the "HDD #1" belongs to the "RG #1."

The column 1306 is the HDD type. For example, the "HDD #1" indicates the HDD whose interface is FC (Fibre Channel) and whose disk is 3.5 inches large and of the frequency 15,000 per minute. The information of this TYPE 1306 and the OPERATION RATE 1308 are the information used for calculating the power consumption.

The column 1307 is the HDD capacity. For example, the "HDD #1" indicates the capacity enough to store 450 GB (Gigabytes) of information.

The column 1308 is the HDD operation rate (the information showing how much of the disk is in operation). The HDD operation rate is the rate of the time from the reception of a read or write request by the HDD till returning a response to a unit of time. For example, "HDD #1" indicates that the disk is in operation at the operation rate 20%. Note that both the number of accesses (IOPS (Input Output Per Second)) and the operation rate can be obtained in the source storage system while only the IOPS can be obtained in the destination storage system. This is because the destination storage system is not in operation yet. Therefore, the power consumption calculation of the destination storage system is performed by using the IOPS. Note that, as the calculation by the operation rate can often obtain a higher precision value than by the IOPS, it is preferable to use the operation rate in the source storage system. if the calculation by the number of accesses (IOPS) can obtain a higher precision value, the number of accesses is used.

The column 1302 is provided when the CONFIGURATION INFORMATION ACQUISITION PROGRAM 1101 obtains information from the CONFIGURATION INFORMATION 904 or the CONFIGURATION INFORMATION 1005. The columns 1303, 1304, 1305, 1306, 1307, and 1308 are the information obtained by the CONFIGURATION INFORMATION ACQUISITION PROGRAM 1101 from the CONFIGURATION INFORMATION 904 or the CONFIGURATION INFORMATION 1005.

Contents of RG Information

FIG. 15 is the diagram showing the contents of RG (RAID Group) information (Table 1501) which is part of the CONFIGURATION INFORMATION 1104.

The column 1502 shows the device where the configuration information is obtained. The row with "SOURCE" in the column 1502 is the RG information of the source storage system, and the row with "DESTINATION" in the column 1502 is the RG information of the destination storage system.

The column 1503 is an identifier for uniquely identifying the RG. For example, the "RG #1" belongs to the source storage system.

The column 1504 is the RAID level of the RG. The RAID level shows the methods for recovering information so as not to lose the information even if a failure occurs in part of a storage system configuring the RAID. For example, the RAID level of the "RG #1" is "RAID 1 (2D+2D)."

The column 1505 is the total capacity of the RG. For example, the "RG #1" shows the capacity enough to store 900 GB of information.

The column 1506 is the free capacity in the RG. For example, the "RG #1" shows the free capacity available to store 500 GB of information.

The column 1507 is the number of accesses to the RG. The number of accesses to the RG is the number of information read/write requests to the RG per unit of time. For example, it shows that the number of accesses to the "RG #1" is 180 IOPS.

The column 1508 is the limit number of accesses to the RG. The limit number of accesses to the RG is the largest number of accesses where the length of time for responding to information read/write requests to the RG does not exceed the value specified in advance. For example, in FIG. 15, the limit number of accesses to the "RG #1" is 1,000 IOPS.

The column 1502 is provided if the CONFIGURATION INFORMATION ACQUISITION PROGRAM 1101 obtains information from the CONFIGURATION INFORMATION 904 or the CONFIGURATION INFORMATION 1005. The columns 1503, 1504, 1505, 1506, 1507, and 1508 are the information obtained by the CONFIGURATION INFORMATION ACQUISITION PROGRAM 1101 from the CONFIGURATION INFORMATION 904 or the CONFIGURATION INFORMATION 1005.

Logical Volume Information

FIG. 16 is a diagram showing the logical volume information (Table 1601) which is part of the CONFIGURATION INFORMATION 1104.

The column 1602 shows the device where the logical volume information is obtained. The row with "SOURCE" in the column 1602 is the logical volume information of the source storage system, and the row with "DESTINATION" in the column 1602 is the logical volume information of the destination storage system.

The column 1603 is an identifier for uniquely identifying the logical volume. For example, "LOGICAL VOLUME #1" belongs to the source storage system.

The column 1604 is an identifier for uniquely identifying the RG to which the logical volume belongs. For example, "LOGICAL VOLUME #1" belongs to the "RG #1."

The column 1605 is the number of accesses to the logical volume (LOAD). For example, it shows that the number of accesses to the "LOGICAL VOLUME #1" is 100 IOPS. Furthermore, the logical volumes belonging to the RG #1 are the LU #1 and the LU #2, and if their LOADs are added, the total number is 180 IOPS, which is the same value as the information of the column 1507 (refer to FIG. 15).

The column 1606 is the limit number of accesses to the logical volume. For example, it shows that the limit number of accesses to the "LOGICAL VOLUME #1" is 500 IOPS. The limit number of accesses to the logical volume is used as a measure of calculation for the number of accesses in logical volume migration. If the LIMIT LOAD 1606 of the LU #1 and the LU #2 are added, the total number is 1,000 IOPS, which is the same value as the information of the column 1508 (refer to FIG. 15).

The column 1607 is the capacity of the logical volume. For example, it shows that the "LOGICAL VOLUME #1" has the capacity enough to store 450 GB of information.

The column 1608 is the free capacity in the logical volume. For example, the "LOGICAL VOLUME #1" shows the free capacity available to store 250 GB of information.

The column 1609 is an identifier for uniquely identifying the pool to which the logical volume belongs. For example, the "LOGICAL VOLUME #7" belongs to the "POOL #1."

The logical volume of the row with the "-(dash)" in the column 1608 shows it does not belong to any pool. For example, "LOGICAL VOLUME #1" does not belong to any pool.

The column 1602 is provided if the CONFIGURATION INFORMATION ACQUISITION PROGRAM 1101 obtains information from the CONFIGURATION INFORMATION 904 or the CONFIGURATION INFORMATION 1005. Furthermore, the columns 1603, 1604, 1605, 1607, 1608 and 1609 are the information obtained by the CONFIGURATION INFORMATION ACQUISITION PROGRAM 1101 from the CONFIGURATION INFORMATION 904 or the CONFIGURATION INFORMATION 1005.

The column 1606 is the information which the CONFIGURATION INFORMATION ACQUISITION PROGRAM 1101 creates when the CONFIGURATION INFORMATION ACQUISITION PROGRAM 1101 obtains information from the CONFIGURATION INFORMATION 904 or the CONFIGURATION INFORMATION 1005. As more specifically described, the value of the column 1606 can be obtained by the limit number of accesses to the RG of the column 1508 divided by the RG capacity of the column 1505 multiplied by the logical volume capacity of the column 1607, for example, the limit number of accesses of the "LOGICAL VOLUME #1" amounts to (1,000 IOPS/900 GB)×450 GB=500 IOPS.

Note that, though the destination storage system is virtualized in FIG. 16, it may also be permitted to virtualize the source storage system.

Contents of POWER CONSUMPTION INFORMATION

FIG. 17 is a diagram showing the contents of POWER CONSUMPTION INFORMATION 1105 (Table 1701) by this embodiment.

The column 1702 is the chassis type. The column 1703 is the HDD type. The column 1704 is the RAID level.

The column 1705 is the calculation formula for the power consumption. Each of the rows 1705 with the "-(dash)" in the columns 1703 and 1704 shows the power consumption of the chassis of the column 1702 from which the HDD power consumption has been excluded. That is, since it is the value from which the HDD has been excluded, the power consumption is the fixed value (b1, b2, and b3).

Each of the rows 1705 with the "-(dash)" in the column 1702 shows the HDD type of the column 1703, and the HDD power consumption at the RAID level of the column 1704.

The HDD power consumption can be obtained either by the number of accesses (IOPS) or by the operation rate. The formula 1706 is the calculation formula for the total power consumption of the HDDs configuring the RG based on the number of accesses (IOPS), and x is the number of accesses (IOPS). The formula 1707 is the calculation formula for the power consumption of an HDD based on the operation rate, and y is the value of the operation rate. By the calculation based on the IOPS, the power consumption of the whole relevant RG can be obtained. Meanwhile, by the calculation based on the operation rate, individual HDD power consumption can be obtained. Therefore, if the power consumption of all the individual HDDs is added, the power consumption of the whole RG can be obtained.

The values (coefficients a and b) other than x and y in the column 1705 are determined by the HDD type, and they are calculated based on the measured power consumption in advance. The power consumption of the chassis is obtained by adding the value of the column 1705 in the row with the same chassis type as the column 1702 to the value obtained by assigning the number of accesses of the RG of the HDDs installed in the chassis of the column 1507 assigned to the formula of the column 1705 of the HDD type as in the column 1703 and the RAID level as in the column 1704.

In this embodiment, the calculation formula of the column 1705 is a primary formula of a constant number x or a primary formula of a constant number y, and the formula is provided with reference to the measured value of the power consumption. Furthermore, if the power consumption is significantly different between when making an information read request and making an information write request, separate formulas are provided for the number of accesses in information read and for the number of accesses in information write. Furthermore, if the power consumption is significantly different between when making a request for reading information from and writing information to sequential areas (sequential access request) and random areas (random access request), separate formulas are provided for the number of sequential accesses and for the number of random accesses.

The columns 1702, 1703, 1704 and 1705 are the information which the CONFIGURATION INFORMATION ACQUISITION PROGRAM 1101 obtains from the CONFIGURATION INFORMATION 904 or the CONFIGURATION INFORMATION 1005.

Contents of Pool Information

FIG. 18 is a diagram showing the contents of CONFIGURATION INFORMATION 1104, which is part of the pool information (Table 1801) by this embodiment.

The column 1802 shows the device where the configuration information is obtained. The row with "SOURCE" in the column 1802 is the pool information of the source storage system, and the row with "DESTINATION" in the column 1802 is the pool information of the destination storage system.

The column 1803 is an identifier for uniquely identifying the pool. For example, the "POOL #1" belongs to the destination storage system.

The column 1804 is the number of accesses to the pool. The number of accesses to the pool is the total number of accesses to all the virtual logical volumes that belong to the pool. For example, the number of accesses to the "POOL #1" is 300 IOPS.

The column 1805 is the limit number of accesses to the pool. The limit number of accesses to the pool is the upper limit value of the total number of accesses to all the virtual logical volumes belonging to the pool. For example, the limit number of accesses to the "POOL #1" is 1,050 IOPS.

The column 1806 is the total capacity of the pool. The total capacity of the pool is the total capacity of all the logical volumes belonging to the pool. For example, the "POOL #1" has the capacity enough to store 2,025 GB of information.

The column 1807 is the free capacity in the pool. The free capacity in the pool is the total free capacity of all the logical volumes belonging to the pool. For example, the "POOL #1" shows the free capacity available to store 25 GB of information.

The column 1802 is provided when the CONFIGURATION INFORMATION ACQUISITION PROGRAM 1101 obtains information from the CONFIGURATION INFORMATION 904 or the CONFIGURATION INFORMATION 1005. The columns 1803, 1804, 1806 and 1807 are the information which the CONFIGURATION INFORMATION ACQUISITION PROGRAM 1101 obtains from the CONFIGURATION INFORMATION 904 or the CONFIGURATION INFORMATION 1005. The column 1805 is created when the CONFIGURATION INFORMATION ACQUISITION PROGRAM 1101 obtains information from the CONFIGURATION INFORMATION 1005. As more specifically described, the value of the column 1805 is the total sum of the limit numbers of accesses in the column 1606 of the rows whose pool identifiers of the column 1609 are the same as the pool identifiers of the column 1803, for example, the limit number of accesses to the "POOL #1" amounts to 350 IOPS+ 350 IOPS+350 IOPS=1,050 IOPS.

Contents of Virtual Logical Volume Creation Plan Information

FIG. 19 is a diagram showing the contents of virtual logical volume creation plan information (Table 1901) which is part of the CONFIGURATION INFORMATION 1104 by this embodiment.

The column 1902 is an identifier for uniquely identifying the virtual logical volume. For example, the "VIRTUAL LOGICAL VOLUME #1" belongs to the destination storage system.

The column 1903 is an identifier for uniquely identifying the pool. For example, "VIRTUAL LOGICAL VOLUME #1" belongs to the "POOL #1."

The column 1904 is the capacity of the virtual logical volume. For example, it shows that the "VIRTUAL LOGICAL VOLUME #1" has the capacity enough to store 450 GB of information.

The column 1905 is the free capacity in the virtual logical volume. For example, it shows that the "VIRTUAL LOGICAL VOLUME #1" has the free capacity available to store 250 GB of information.

Contents of Virtual Logical Volume allocation Information

FIG. 20 is a diagram showing the virtual logical volume allocation plan information (Table 2001) which is part of the CONFIGURATION INFORMATION 1005 by this embodiment.

The column 2002 is an identifier for uniquely identifying the virtual logical volume. The column 2003 is the start address of the virtual logical volume area. The column 2004 is the end address of the virtual logical volume area.

The column 2005 is an identifier for uniquely identifying the logical volume. The column 2006 is the start address of the logical volume area. The column 2007 is the end address of the logical volume area. For example, the information on the area from 0 to 99 of the "VIRTUAL LOGICAL VOLUME #1" is stored in the area from 0 to 99 of the "LOGICAL VOLUME #7."

Contents of the Pool Threshold

FIG. 21 is a diagram showing the pool threshold (Table 2101) which is part of the CONFIGURATION INFORMATION 1104 by this embodiment. The values of this table are specified in advance.

The column 2102 is an identifier for uniquely identifying the pool.

The column 2103 is the rate of the upper limit number of accesses to the virtual logical volumes belonging to the pool to the limit number of accesses to the pool in the column 1805. For example, a virtual logical volume is placed with the total number of accesses to the virtual logical volumes belonging to the "POOL #1" being 70% of 1,050 IOPS i.e. 735 IOPS or less.

The column 2104 is the rate of the upper limit capacity of the virtual logical volumes belonging to the pool to the pool capacity in the column 1806. For example, a virtual logical volume is placed with the total capacity of the virtual logical volumes belonging to the "POOL #1" being 90% of 2,025 GB i.e. 1,822.5 IOPS or less.

Contents of External Logical Volume Information

FIG. 22 is a diagram showing the external logical volume information (Table 2201) which is part of the CONFIGURATION INFORMATION 1104 by this embodiment.

The column 2202 is an identifier for uniquely identifying the external logical volume.

The column 2203 is an identifier for uniquely identifying the logical volume which actually reads and writes information when information read/write requests are transmitted to the external logical volume. For example, if an information read/write request is transmitted to the "EXTERNAL LOGICAL VOLUME #1," information read/write is performed for the "LOGICAL VOLUME #1."

The columns 2202 and 2203 are the information the CONFIGURATION INFORMATION ACQUISITION PROGRAM 1101 obtains from the CONFIGURATION INFORMATION 904.

Note that the external logical volume is the technology of making the logical volumes stored in the source storage system appear to exist in the destination storage system.

Correlation of Logical Volumes

Figure 23:
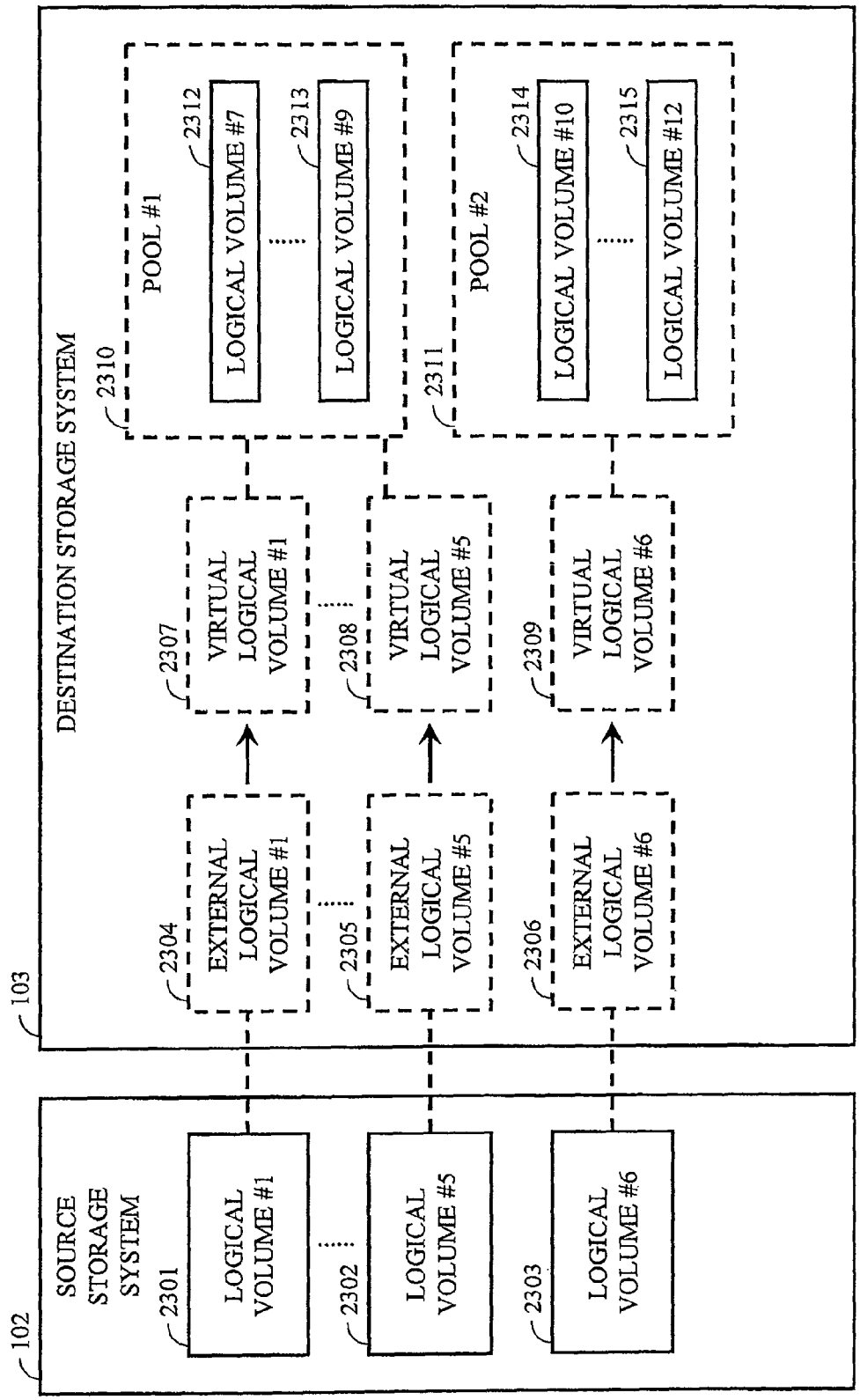
FIG. 23 is a diagram showing the relationship among virtual logical volumes, pools and logical volumes, and the relationship between external logical volumes and logical volumes by this embodiment.

FIG. 23 is a diagram showing the relationship between virtual logical volumes, pools and logical volumes, and the relationship between external volumes and logical volumes in the SOURCE STORAGE SYSTEM 102 and DESTINATION STORAGE SYSTEM 103 by this embodiment.

In the SOURCE STORAGE SYSTEM 102, the LOGICAL VOLUME #1_2301, the LOGICAL VOLUME #5_2302, the LOGICAL VOLUME #6_2303 and others are stored.

Meanwhile, in the DESTINATION STORAGE SYSTEM 103, the EXTERNAL LOGICAL VOLUME #1_2304, the EXTERNAL LOGICAL VOLUME #2_2305, the EXTERNAL LOGICAL VOLUME #6_2306, the VIRTUAL LOGICAL VOLUME #1_2307, the VIRTUAL LOGICAL VOLUME #5_2308, the VIRTUAL LOGICAL VOLUME #6_2309, the POOL #1 2310, the POOL #2_2311, the LOGICAL VOLUME #7_2312, the LOGICAL VOLUME #9_2313, the LOGICAL VOLUME #10_2314, the LOGICAL VOLUME #12_2315 and others are stored.

For example, the EXTERNAL LOGICAL VOLUME #1_2304 and the LOGICAL VOLUME #1_2301 are made corresponding with each other by the Table 2201. For example, the VIRTUAL LOGICAL VOLUME #1_2307 and the POOL #1_2310 are made corresponding with each other by the Table 1901. For example, the POOL #1_2310, the LOGICAL VOLUME #7_2312, the LOGICAL VOLUME #9_2313 and others are made corresponding with each other by the Table 1601. For example, the VIRTUAL LOGICAL VOLUME #1_2307, the LOGICAL VOLUME #7_2312, the LOGICAL VOLUME #9_2313 and others are made corresponding with each other by the Table 2001.

Setting Screen (GUI) Example

Figure 24:
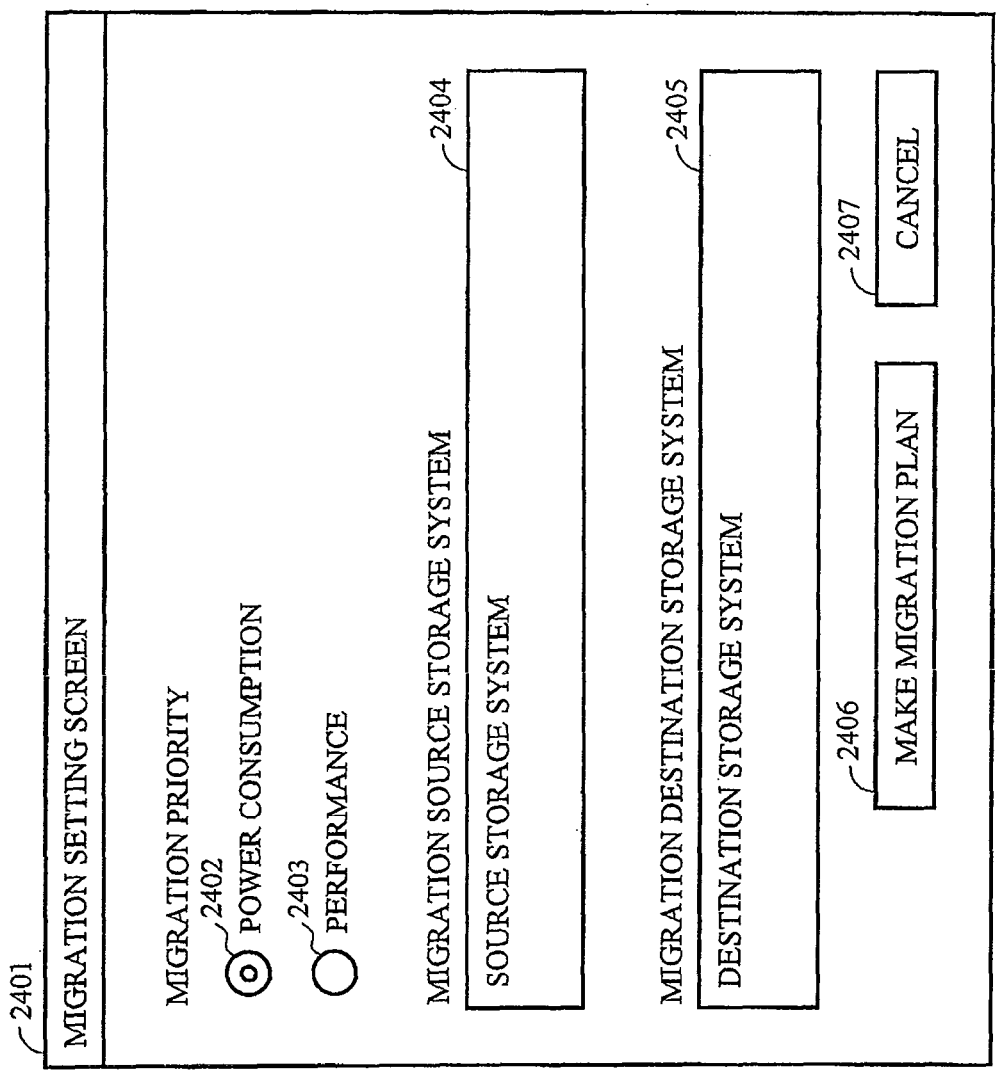
FIG. 24 is a diagram showing a setting screen by this embodiment.

FIG. 24 is a diagram showing a setting screen (GUI) example (MIGRATION SETTING SCREEN 2401) by this embodiment.

In FIG. 24, the radio buttons 2402 and 2403 are the radio buttons for selecting whether to prioritize power consumption reduction or performance deterioration prevention when creating the logical volume migration plan. Power consumption reduction is prioritized if the administrator (user) clicks the radio button 2402, and performance deterioration prevention is prioritized if the radio button 2403 is clicked.

The text input box 2404 is the box for entering the identifier for uniquely identifying the source storage system. As the SOURCE STORAGE SYSTEM 102 is the source in this embodiment, "SOURCE STORAGE SYSTEM" is entered to the text input box 2404. If there are two or more source storage systems, the identifiers of the two or more source storage systems are entered to the text input box 2404.

The text input box 2405 is the box for entering the identifier for uniquely identifying the destination storage system. As the DESTINATION STORAGE SYSTEM 103 is the destination in this embodiment, "DESTINATION STORAGE SYSTEM" is entered to the text input box 2405. If there are two or more destination storage systems, the identifiers of the two or more destination storage systems are entered to the text input box 2405.

The button 2406 is the button for starting the creation of a logical volume migration plan.

The button 2407 is the button for ending the VOLUME MIGRATION PLAN CREATION PROGRAM 1103.

Migration Plan Screen Example

Figure 25:
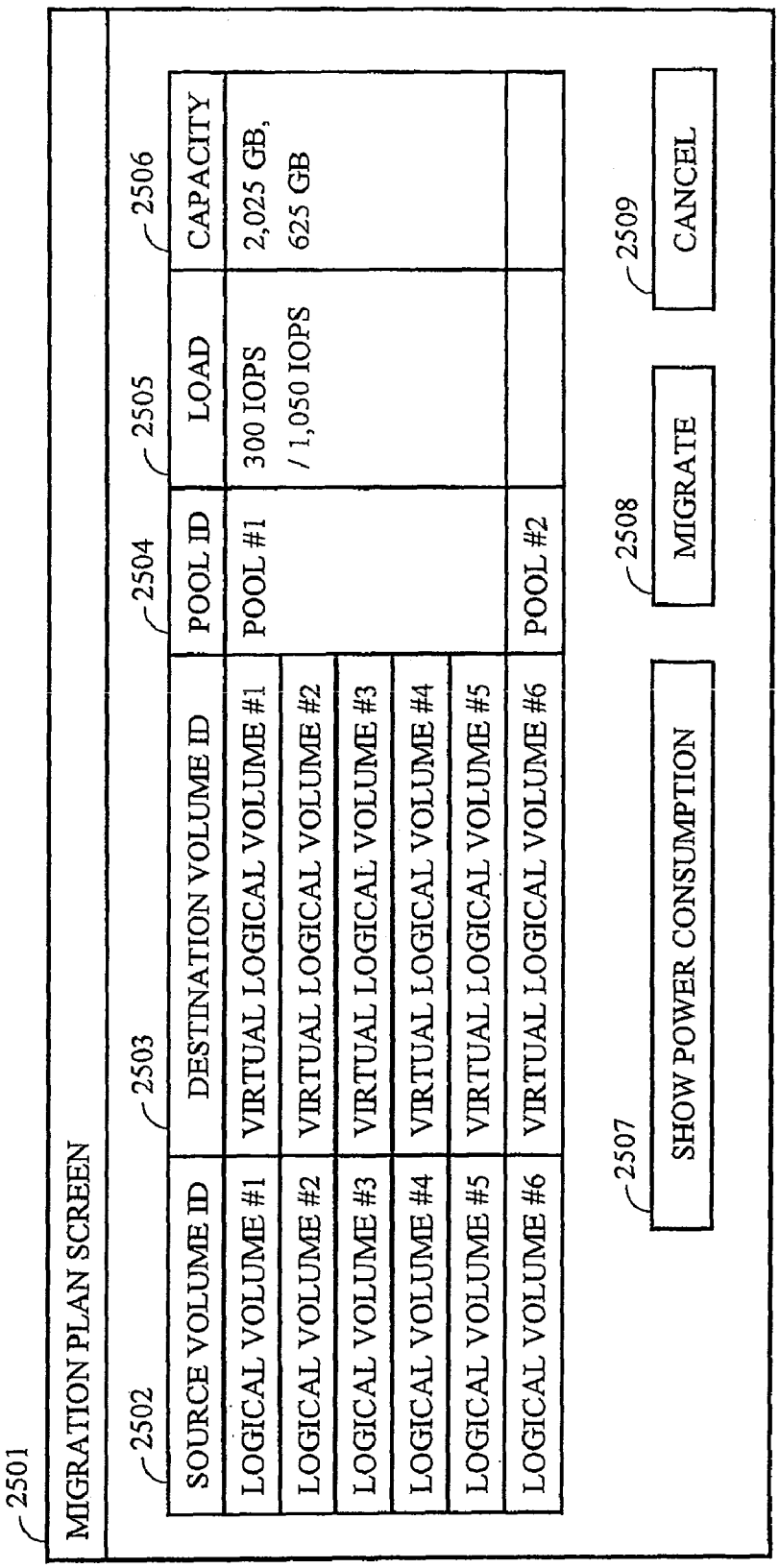
FIG. 25 is a diagram showing a migration plan screen by this embodiment.

FIG. 25 is a diagram showing a migration plan screen (MIGRATION PLAN SCREEN 2501) example by this embodiment. That is, FIG. 25 shows the result of the migration plan creation formula.

In FIG. 25, the column 2502 is an identifier for uniquely identifying the source logical volume.

The column 2503 shows an identifier for uniquely identifying the destination virtual logical volume.

The column 2504 shows an identifier for uniquely identifying the pool to which the destination virtual logical volume belongs.

The column 2505 shows the number of accesses to the pool to which the destination virtual logical volume belongs and the limit number of accesses to the pool to which the destination virtual logical volume belongs.

The column 2506 shows the capacity of the pool to which the destination virtual logical volume belongs and the free capacity in the pool to which the destination virtual logical volume belongs. For example, the destination of the "LOGICAL VOLUME #1" is the "VIRTUAL LOGICAL VOLUME #1." The "VIRTUAL LOGICAL VOLUME #1" belongs to the "POOL #1," and the number of accesses to the "POOL #1" is 300 IOPS. Furthermore, the limit number of accesses to the "POOL #1" is 1,050 IOPS, the capacity of the "POOL #1" is 2,025 GB, and the free capacity in the "POOL #1" is 625 GB.

The button 2507 is the button for displaying the POWER CONSUMPTION SCREEN 2601.

The button 2508 is the button for starting the logical volume migration following the logical volume migration plan.

The button 2509 is the button for ending the VOLUME MIGRATION PLAN CREATION PROGRAM 1103.

Power Consumption Screen Example

Figure 26:
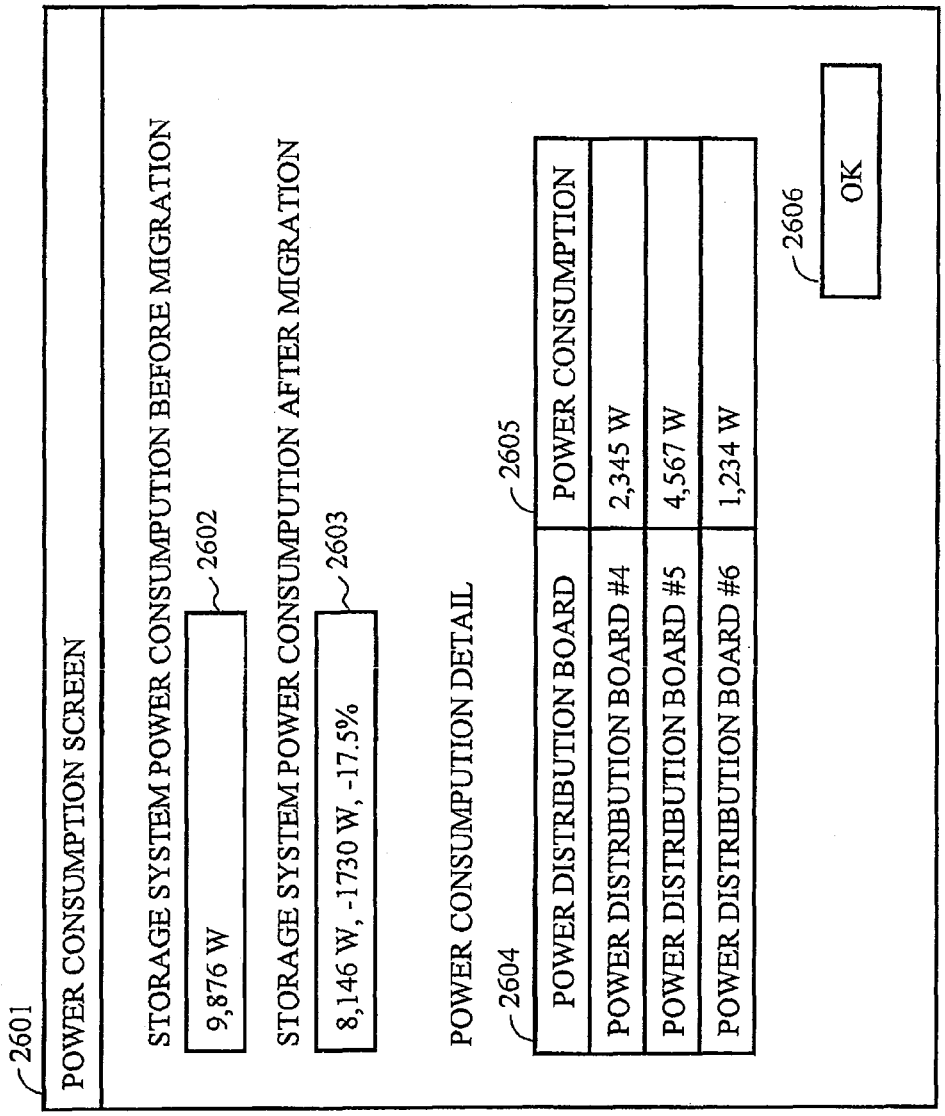
FIG. 26 is a diagram showing a power consumption screen by this embodiment.

FIG. 26 is a diagram showing a POWER CONSUMPTION SCREEN 2601 by this embodiment.

In FIG. 26, the text display box 2602 displays the power consumption of the storage system before migration.

The text display box 2603 displays the power consumption of the storage system after migration, the amount of power consumption reduction, and the power consumption reduction rate.

The column 2604 shows an identifier for uniquely identifying a power distribution board.

The column 2605 shows the power supplied by the power distribution board. For example, the "POWER DISTRIBUTION BOARD #4" supplies 2,345 W.

The button 2606 is the button for closing the POWER CONSUMPTION SCREEN 2601.

Outline of Logical Volume Migration Processing

Figure 27:
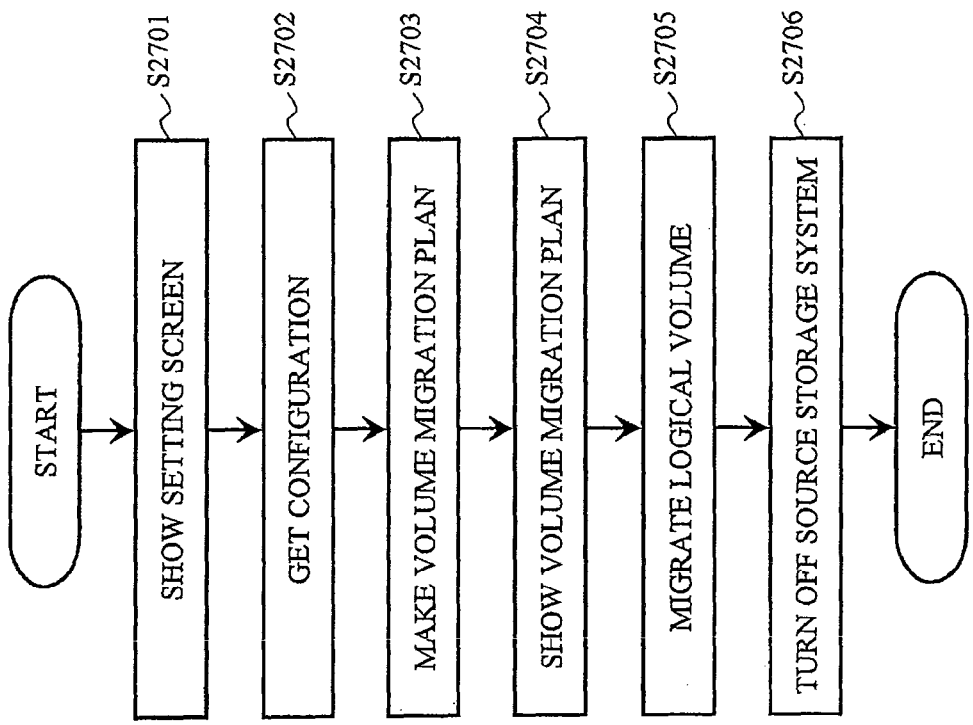
FIG. 27 is a flowchart showing the processing of logical volume migration by this embodiment.

FIG. 27 is a flowchart showing the processing of logical volume migration by this embodiment.

i) At the step S2701, the VOLUME MIGRATION PLAN CREATION PROGRAM 1103 displays the MIGRATION SETTING SCREEN 2401 on the DISPLAY 708. The administrator performs input by the KEYBOARD 706 or the MOUSE 707. The processing proceeds to the step S2702 after the administrator clicks the radio button 2402 or the radio button 2403, enters the source storage system in the text input box 2404, enters the DESTINATION storage system in the text input box 2405, and clicks the button 2406.

ii) At the step S2702, the CONFIGURATION INFORMATION ACQUISITION PROGRAM 1101 obtains configuration information from the SOURCE STORAGE SYSTEM 102 and the DESTINATION STORAGE SYSTEM 103, and stores it in the CONFIGURATION INFORMATION 1104.

At the step S2703, the VOLUME MIGRATION PLAN CREATION PROGRAM 1103 creates a logical volume migration plan. The details of the step S2703 are described later, with reference to FIG. 28.

iii) At the step S2704, the VOLUME MIGRATION PLAN CREATION PROGRAM 1103 displays the MIGRATION PLAN SCREEN 2501 on the DISPLAY 708. In the columns 2502, 2503, 2504, 2505 and 2506, the values obtained by the calculation at the step S2703 are displayed.

When the administrator clicks the button 2507, the POWER CONSUMPTION SCREEN 2601 is displayed on the DISPLAY 708. Furthermore, in the text display box 2602, the power consumption of the source storage system is displayed. The power consumption is calculated by using the calculation formula for the power consumption in Table 1701 with reference to the number of accesses in the column 1605 of the rows with "SOURCE" in the column 1602, the HDD type of the column 1306 of the rows with "SOURCE" in the column 1302, the RAID level of the column 1504 of the rows with "SOURCE" in the column 1502, and the chassis identifier in the column 1304 of the rows with "SOURCE" in the column 1302. In the text display box 2603, the power consumption, the amount of power consumption reduction, and the power consumption reduction rate of the destination storage system calculated at the step S2703 are displayed. The amount of power consumption reduction is the value of the power consumption of the destination storage system from which the value of the power consumption of the source storage system is subtracted. Furthermore, the power consumption reduction rate is the value of the amount of power consumption reduction divided by the power consumption of the source storage system. In the column 2604, the column 1204 of the rows with "DESTINATION" in the column 1202 is displayed. In the column 2605, the power consumption of the power distribution board in the column 2604 calculated at the step S2703 is displayed. The processing proceeds to the step S2705 if the administrator clicks the button 2508.

iv) At the step S2705, the VOLUME MIGRATION PLAN CREATION PROGRAM 1103, following Table 1901, creates a virtual logical volume in the DESTINATION STORAGE SYSTEM 103. After creating the virtual logical volume, the VOLUME MIGRATION PROGRAM 1004 migrates the external logical volume in the column 2202 of the rows whose values of the 2502 are the same as the values of the column 2203 to the virtual logical volume in the column 2503. For example, the EXTERNAL LOGICAL VOLUME #1_2304 is migrated to the VIRTUAL LOGICAL VOLUME #1_2307.

v) At the step S2706, the STORAGE SHUTDOWN PROGRAM 903 stops the SOURCE STORAGE SYSTEM 102.

Details of Logical Volume Migration Plan Creation Processing (Step S2703)

Figure 28:
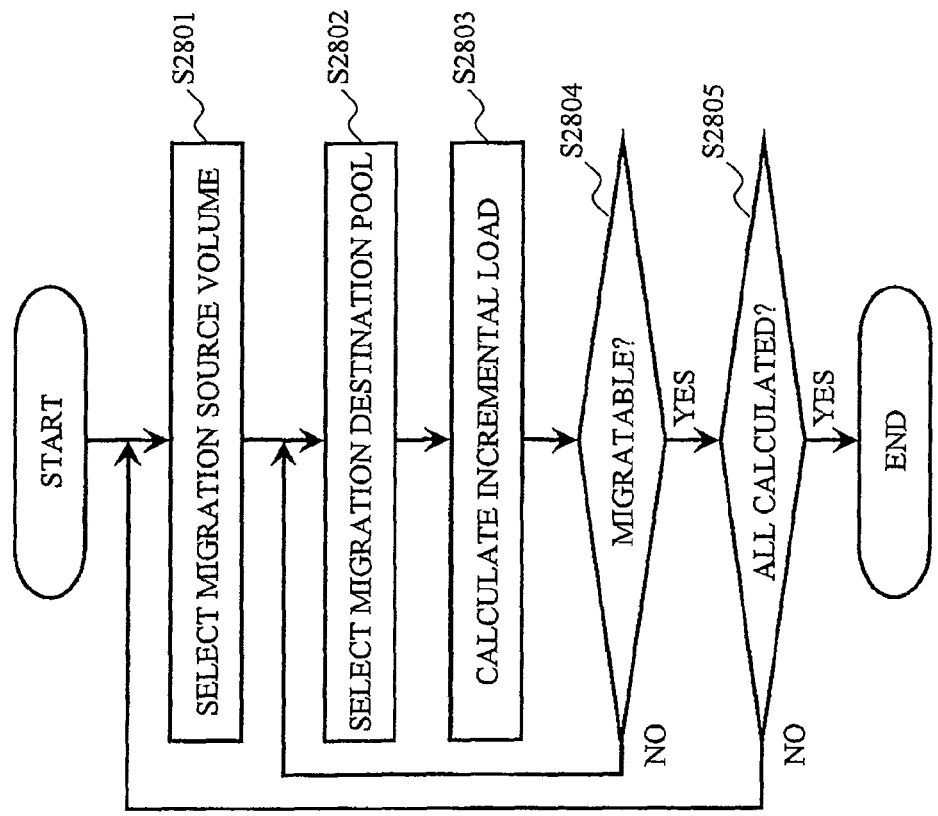
FIG. 28 is a flowchart showing the processing of creating a logical volume migration plan by this embodiment.

FIG. 28 is a flowchart showing the details of the processing of creating a logical volume migration plan (S2703) by this embodiment.

i) At the step S2801, the VOLUME MIGRATION PLAN CREATION PROGRAM 1103 selects one source logical volume. If the administrator clicks the radio button 2402 (to select prioritizing power consumption reduction) at the step S2701, one logical volume whose column 1602 is "SOURCE" from Table 1601, whose destination is not specified, and whose total capacity (column 1607) is the largest is selected. If the administrator clicks the radio button 2403 (to select prioritizing performance) at the step S2701, one logical volume whose column 1602 is "SOURCE" from Table 1601, whose destination is not specified, and whose LOAD (column 1605) is the largest is selected.

ii) At the step S2802, the VOLUME MIGRATION PLAN CREATION PROGRAM 1103 selects one destination pool. If the administrator clicks the radio button 2402 (to select prioritizing power consumption reduction) at the step S2701, one pool whose column 1802 is "DESTINATION" from Table 1801, and whose total capacity (column 1806) is the largest is selected. If the administrator clicks the radio button 2403 (to select prioritizing performance) at the step S2701, one pool whose column 1802 is "DESTINATION" from Table 1801, whose value of the LIMIT LOAD (column 1805) from which the value of the LOAD (column 1804) is subtracted is the largest is selected.

iii) At the step S2803, the VOLUME MIGRATION PLAN CREATION PROGRAM 1103 calculates the increments of the number of accesses and the capacity of the logical volumes belonging to the pool selected at the step S2802 when the logical volume selected at the step S2801 is migrated to the pool selected at the step S2802. Note that, at the step S2803, the same processing is performed whether the radio button 2402 or 2403 is selected.

The access increment is the number of accesses of the logical volume selected at the step S2801 divided by the number of logical volumes belonging to the pool selected at the step S2802. The number of accesses of the logical volume selected at the step S2801 is the value of the LIMIT LOAD (column 1605).

The number of logical volumes belonging to the pool selected at the step S2802 can be obtained by the number of rows whose POOL IDs (column 1609) are the same as the POOL IDs selected at the step S2802. For example, the number is 3 for the POOL ID #3 (refer to FIG. 16).

The capacity increment is the value of the capacity of the logical volume selected at the step S2801 divided by the number of logical volumes belonging to the pool selected at the step S2802. The capacity of the logical volume selected at the step S2801 is the value of the total capacity in the column 1607.

In each of the logical volumes belonging to the pool selected at the step S2802, the logical volume selected at the step S2801 can be migrated to the pool selected at the step S2802 if the total sum of the number of accesses and the access increments in the column 1605 is smaller than or equal to the LIMIT LOAD of the column 1606, the capacity increment is smaller than or equal to the free capacity in the column 1608, and the power consumption of the chassis is smaller than or equal to the value of the column 1205 (LIMIT POWER CONSUMPTION) multiplied by the value of the column 1206 (MIGRATION LIMIT RATE).

The power consumption of the chassis is calculated by using the calculation formula for the power consumption with reference to the number of accesses and the access increment in the column 1605, the HDD type in the column 1306, the RAID level in the column 1504, and the chassis identifier in the column 1304. If migration is possible, Tables 1601 and 1901 are updated.

In each of the logical volumes belonging to the pool selected at the step S2802, the VOLUME MIGRATION PLAN CREATION PROGRAM 1103 adds the access increment to the column 1605 and subtracts the capacity increment from the column 1607, and stores them in Table 1601. Furthermore, the VOLUME MIGRATION PLAN CREATION PROGRAM 1103 stores the creation plan of the virtual logical volume to be the destination of the logical volume selected at the step S2801 in Table 1901. The column 1902 is considered to be the value for uniquely identifying a newly created virtual logical volume. The column 1903 is considered to be the pool selected at the step S2802. The column 1904 is considered to be the capacity of the logical volume selected at the step S2802. The column 1905 is considered to be the free capacity in the logical volume selected at the step S2802.

iv) At the step S2804, if the migration is permitted at the step S2803, the VOLUME MIGRATION PLAN CREATION PROGRAM 1103 promotes the processing to the step 2805. If the migration is not permitted, the VOLUME MIGRATION PLAN CREATION PROGRAM 1103 returns the processing to the step 2802. However, in this case, the step S2802 proceeds the processing without selecting the already selected pool.

v) At the step S2805, if the destinations of all the source logical volumes are determined, the processing is considered to be completed. If the destinations of all the source logical volumes are not determined, the processing returns to the step 2801. However, in this case, the step S2801 proceeds the processing without selecting the already selected logical volume.

Controlling the Power Consumption After Logical Volume Migration

Figure 29:
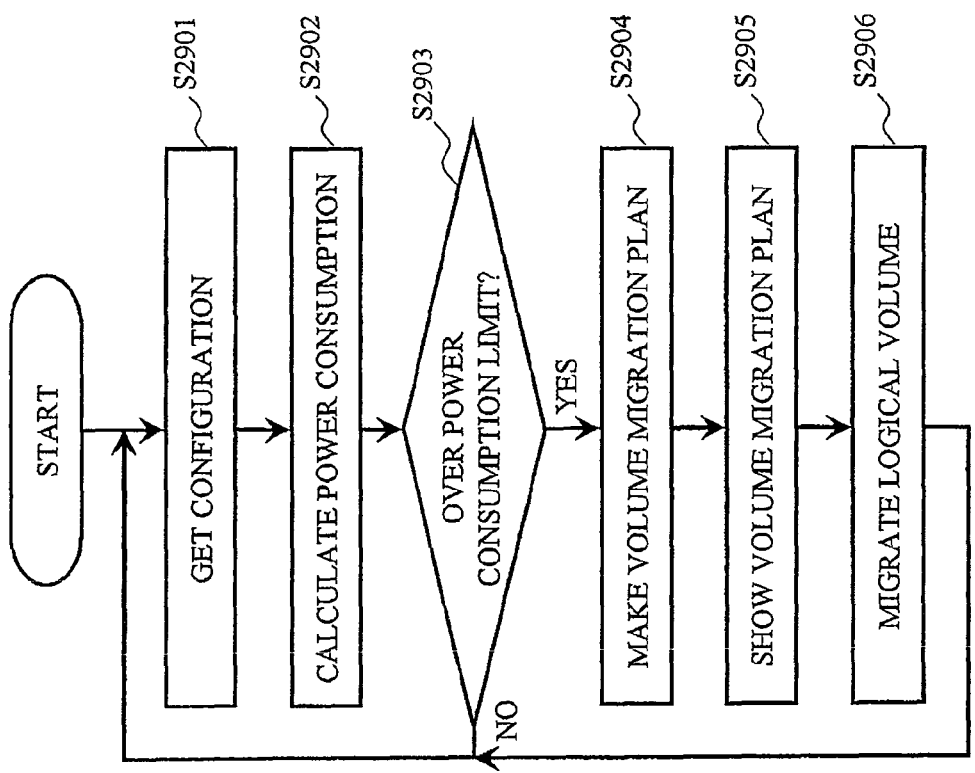
FIG. 29 is a flowchart showing the processing of, after logical volume migration, keeping the power consumption less than or equal to the upper limit value by this embodiment.

FIG. 29 is a flowchart showing the processing of keeping the power consumption less than or equal to the upper limit value after logical volume migration by this embodiment.

At the step S2901, the CONFIGURATION INFORMATION ACQUISITION PROGRAM 1101 obtains configuration information from the DESTINATION STORAGE SYSTEM 103, and stores it in the CONFIGURATION INFORMATION (storage) 1104.

At the step S2902, the VOLUME MIGRATION PLAN CREATION PROGRAM 1103 calculates the power consumption per chassis of the DESTINATION STORAGE SYSTEM 103. The power consumption per chassis is calculated by using the calculation formula for the power consumption with reference to the number of accesses in the column 1605 of the rows with "DESTINATION" in the column 1602, the HDD type in the column 1306 of the rows with "DESTINATION" in the column 1302, the RAID level in the column 1504 of the rows with "DESTINATION" in the column 1502, and the chassis identifier in the column 1304 of the rows with "DESTINATION" in the column 1302.

At the step S2903, the VOLUME MIGRATION PLAN CREATION PROGRAM 1103 determines whether the power consumption of each chassis exceeds the limit value. If the power consumption calculated at the step S2902 exceeds the value in the column 1205 multiplied by the value in the column 1207 (limit value), the VOLUME MIGRATION PLAN CREATION PROGRAM 1103 determines that the power consumption is about to exceed the limit value, and the processing proceeds to the step S2904. Otherwise, the processing returns to the step S2901.

At the step S2904, the VOLUME MIGRATION PLAN CREATION PROGRAM 1103 creates a logical volume migration plan. The details of the step S2904 are described later, with reference to FIG. 30.

At the step S2905, the VOLUME MIGRATION PLAN CREATION PROGRAM 1103 displays the MIGRATION PLAN SCREEN 2501 on the DISPLAY 708. In the columns 2502, 2503, 2504, 2505 and 2506, the values obtained by the calculation at the step S2904 are displayed. When the administrator clicks the button 2507 (FIG. 25), the POWER CONSUMPTION SCREEN 2601 is displayed on the DISPLAY 708. In the text display box 2602, the power consumption value of the source storage system before the migration, which has been calculated at S2902 is displayed. In the text display box 2603, the power consumption, the amount of power consumption reduction, and the power consumption reduction rate of the destination storage system after the migration, which have been calculated at the step S2904, are displayed. In the column 2604, the information of the column 1204 is displayed. In the column 2605, the power consumption value of the power distribution board in the column 2604 calculated at the step S2904 is displayed. The processing proceeds to the step S2906 if the administrator clicks the button 2508 (FIG. 25).

At the step S906, the VOLUME MIGRATION PLAN CREATION PROGRAM 1103 creates a virtual logical volume to be the destination. After the virtual logical volume is created, the VOLUME MIGRATION PROGRAM 1004 migrates data to the virtual logical volume following the migration plan created at the step S2904.

Details of the Logical Volume Migration Plan Creation Processing (S2904)

Figure 30:
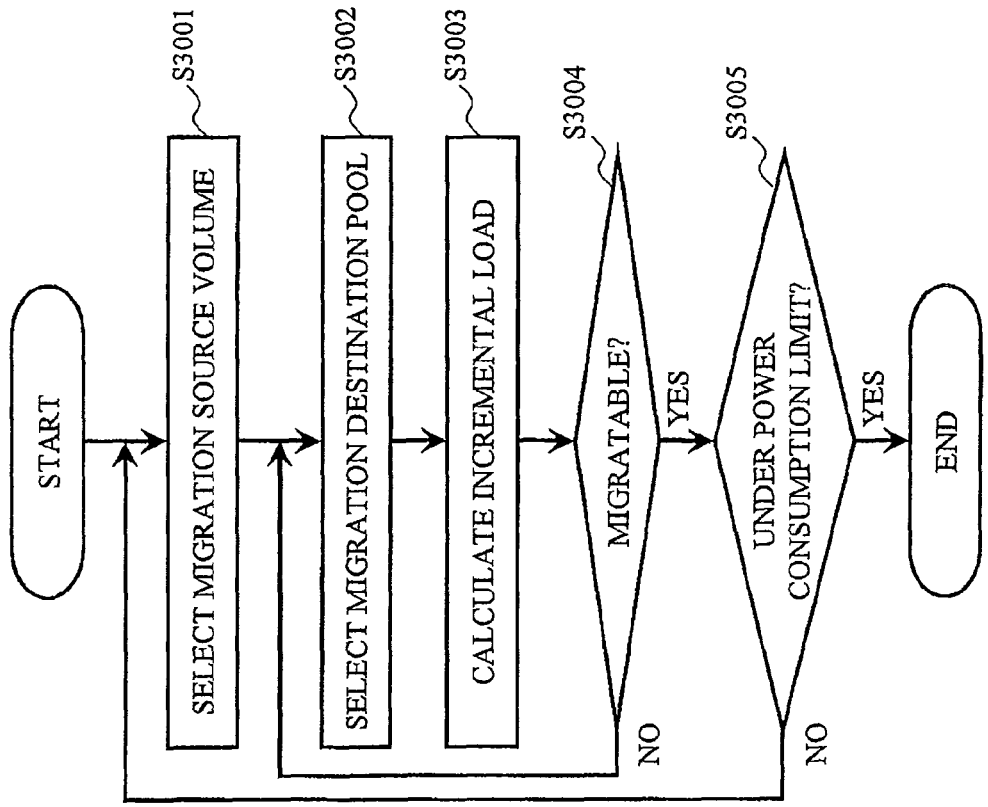
FIG. 30 is a flowchart showing the processing of creating a logical volume migration plan (S2904) in FIG. 29 in details, by this embodiment.

FIG. 30 is a flowchart showing the processing of logical volume migration plan creation in FIG. 29 (step S2904) in details by this embodiment.

At the step S3001, the VOLUME MIGRATION PLAN CREATION PROGRAM 1103 selects one source logical volume from among the chassis whose power consumption has exceeded the threshold at the step S2903. If the administrator clicks the radio button 2402 (FIG. 24), one logical volume with the largest capacity among the virtual logical volumes belonging to the pool in the chassis whose power consumption has exceeded the threshold at the step S2903 is selected as a source logical volume. Meanwhile, if the administrator clicks the radio button 2403 (FIG. 24), one logical volume with the largest number of accesses among the virtual logical volumes belonging to the pool in the chassis whose power consumption is determined to have exceeded the threshold at the step S2903 is selected as a source logical volume.

At the step S3002, the VOLUME MIGRATION PLAN CREATION PROGRAM 1103 selects one destination pool. At the step S2701, if the administrator clicks the radio button 2402, one pool with the largest capacity among the pools whose power consumption values do not exceed the values in the column 1205 multiplied by the values in the column 1206 is selected. Meanwhile, if the administrator clicks the radio button 2403, one pool with the largest value of the limit number of accesses from which the number of accesses is subtracted (safety margin of the number of accesses/capacity) among the pools whose power consumption values do not exceed the values in the column 1205 multiplied by the values in the column 1206 is selected.

At the step S3003, the VOLUME MIGRATION PLAN CREATION PROGRAM 1103, as in the step 2803, calculates the increments of the number of accesses and the capacity and the power consumption, and determines whether the migration is possible.

At the step S3004, if the migration is determined to be possible at the step S3003, the processing proceeds to the step S3005. If not, the processing returns to the step S3002. In this case, the step S3002 proceeds the processing without selecting the already selected pool.

At the step S3005, if the power consumption per chassis calculated at the step S3003 is smaller than or equal to the value of the column 1205 multiplied by the value of the column 1206, the processing is completed. Otherwise, the processing returns to the step S3001. In this case, the step S3001 proceeds the processing without selecting the already selected logical volume.

Migration When the Setting Change is Performed after Logical Volume Migration

Figure 31:
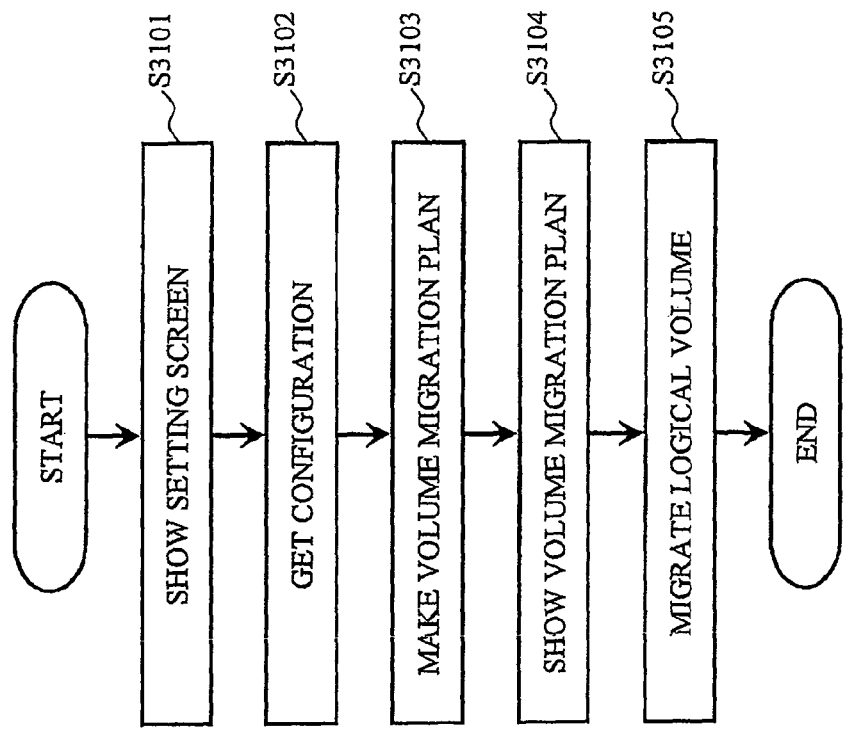
FIG. 31 is a flowchart showing the processing of, when changing the setting after logical volume migration, migrating logical volumes by this embodiment.

FIG. 31 is a flowchart showing the processing of migrating logical volumes by this embodiment when changing the setting after logical volume migration. In this case, the setting change is defined as changing the priority by the administrator, whether to prioritize power consumption reduction or to prioritize performance deterioration prevention.

At the step S3101, the VOLUME MIGRATION PLAN CREATION PROGRAM 1103 displays the MIGRATION SETTING SCREEN 2401 on the DISPLAY 708. The administrator performs input by the KEYBOARD 706 or the MOUSE 707. The processing proceeds to the step S3102 after the administrator clicks the radio button 2402 or the radio button 2403, enters the source storage system in the text input box 2404, enters the destination storage system in the text input box 2405, and clicks the button 2406. At this time, the contents in the text input box 2404 and the text input box 2405 are both "DESTINATION STORAGE SYSTEM."

At the step S3102, the CONFIGURATION INFORMATION ACQUISITION PROGRAM 1101 obtains configuration information from the DESTINATION STORAGE SYSTEM 103 and stores it in the CONFIGURATION INFORMATION 1104.

At the step S3103, the VOLUME MIGRATION PLAN CREATION PROGRAM 1103 creates a logical volume migration plan. The details of the step S3103 are described later, with reference to FIG. 32.

At the step S3104, the VOLUME MIGRATION PLAN CREATION PROGRAM 1103 displays the MIGRATION PLAN SCREEN 2501 on the DISPLAY 708. In the columns 2502, 2503, 2504, 2505 and 2506, the values obtained by the calculation at the step S3103 are displayed.

At the step S3105, the VOLUME MIGRATION PLAN CREATION PROGRAM 1103 creates a virtual logical volume to be the destination. After the virtual logical volume is created, the VOLUME MIGRATION PROGRAM 1004 migrates data to the virtual logical volume following the migration plan created at the step S3103.

Details of Logical Volume Migration Plan Creation Processing (Step S23103)

Figure 32:
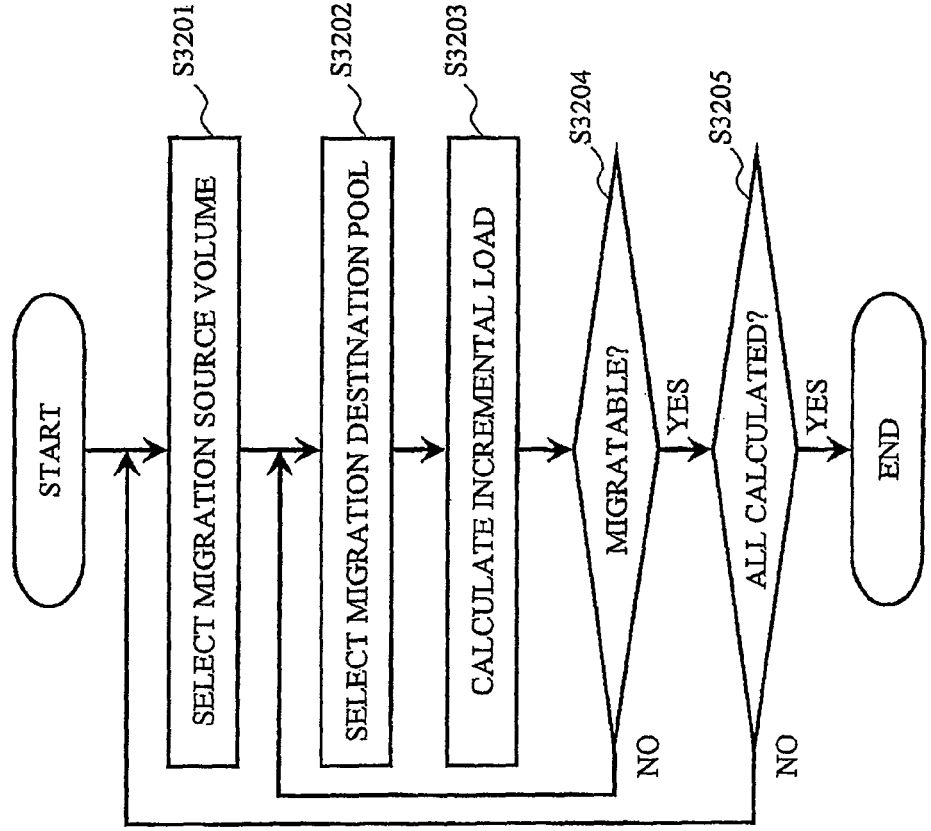
FIG. 32 is a flowchart showing the processing of creating a logical volume placement plan in FIG. 31 in details, by this embodiment.

FIG. 32 is a flowchart showing the processing of logical volume migration plan creation in FIG. 31 (Step S23103) in details, by this embodiment.

At the step S3201, if the administrator clicks the radio button 2402 at the step S3101 (to change from prioritizing performance to prioritizing power consumption), the VOLUME MIGRATION PLAN CREATION PROGRAM 1103 selects one logical volume with the largest number of accesses in the pool with the smallest number of empty accesses. In this case, the number of empty accesses to the pool is defined as the value of the limit number of accesses in the column 1805 from which the number of accesses in the column 1804 is subtracted. Meanwhile, if the administrator clicks the radio button 2403 at the step S3101 (to change from prioritizing power consumption to prioritizing performance), the VOLUME MIGRATION PLAN CREATION PROGRAM 1103 selects one logical volume with the largest capacity in the pool with the largest free capacity.

At the step S3203, if the administrator clicks the radio button 2402 at the step S3101, and if the number of accesses to the logical volume selected at the step S3201 is smaller than or equal to half of the value the number of empty accesses calculated at the step S3202 from which the number of empty accesses calculated at the step S3201 (i.e. the determination is based on whether the capacity of the logical volume after the migration is off balance), the VOLUME MIGRATION PLAN CREATION PROGRAM 1103, as in the step 2803, calculates the increments of the number of accesses and the capacity and the power consumption, and determines whether the migration is possible. If the number of accesses to the logical volume selected at the step S3201 is larger than or equal to half of the value the number of empty accesses calculated at the step S3202 from which the number of empty accesses calculated at the step S3201, the VOLUME MIGRATION PLAN CREATION PROGRAM 1103 determines that the migration is not possible. Meanwhile, if the administrator clicks the radio button 2403 at the step S3101, the VOLUME MIGRATION PLAN CREATION PROGRAM 1103, as in the step 2803, calculates the increments of the number of accesses and the capacity and the power consumption, and determines whether the migration is possible. That is, in each logical volume belonging to the pool selected at the step S3202, the logical volume selected at the step S3201 can be migrated to the pool selected at the step S3202 if the total sum of the number of accesses and the access increments in the column 1605 is smaller than or equal to the LIMIT LOAD of the column 1606, the capacity increment is smaller than or equal to the free capacity in the column 1608, and the power consumption of the chassis is smaller than or equal to the value of the column 1205 (LIMIT POWER CONSUMPTION) multiplied by the column 1206 (MIGRATION LIMIT RATE).

At the step S3204, if the migration is determined to be possible at the step S3203, the processing proceeds to the step S3205. Otherwise, the processing returns to the step S3202. In this case, the step S3202 proceeds the processing without selecting the already selected pool.

At the step S3205, if the calculation is performed for all the logical volumes at the step S3201, the VOLUME MIGRATION PLAN CREATION PROGRAM 1103 performs the calculation for the next pool, and finishes the processing if all the pools are calculated. Otherwise, the processing returns to the step S3201. In this case, the step S3201 proceeds the processing without selecting the already selected logical volume.

Summary

By the above-mentioned processing, logical volumes can be migrated from the SOURCE STORAGE SYSTEM 102 to the DESTINATION STORAGE SYSTEM 103 while maintaining the performance and the capacity of the logical volumes and keeping the power consumption of each power distribution board not to exceed the upper limit. Furthermore, when migrating logical volumes from the SOURCE STORAGE SYSTEM 102 to the DESTINATION STORAGE SYSTEM 103, the administrator can select whether to prioritize power consumption reduction or performance deterioration prevention. Furthermore, after logical volume migration from the SOURCE STORAGE SYSTEM 102 to the DESTINATION STORAGE SYSTEM 103, the administrator can select whether to prioritize power consumption reduction or performance deterioration prevention. Furthermore, after logical volume migration from the SOURCE STORAGE SYSTEM 102 to the DESTINATION STORAGE SYSTEM 103, if the power consumption is likely to exceed the upper limit per power distribution board, the logical volumes can be migrated for the prevention of exceeding the upper limit per power distribution board of the power consumption. Furthermore, by using Table 1701, the power consumption per RAID level can be calculated, and the power consumption can be calculated in a pool configured of multiple chassis and racks.

Furthermore, by using Table 1701, the power consumption can be calculated in a pool configured of RGs with different HDD types and RAID levels.

Note that, though this embodiment specifies the limit power consumption per power distribution board, the limit power consumption can also be specified per current limiter (circuit breaker) connected to the power distribution board or per outlet for the connection with the storage system.

Furthermore, though this embodiment uses the number of accesses for the calculation of the power consumption of the source storage system at the step S2704, the operation rate in the column 1308 can be used instead of the number of accesses.

The number of accesses can also be the number of accesses in a day divided by 86,400 (60×60×24), the number of accesses in an hour divided by 3,600 (60×60), or the number of accesses in a second.

Similarly, the operation rate can also be the amount of access time in a day divided by 86,400 (60×60×24), the amount of access time in an hour divided by 3,600 (60×60), or the amount of access time in a second. Access time is the time from the reception of a read or write request till returning a response.

In this embodiment, the access increment at the step S2803 is considered to be the number of accesses to the source logical volume divided by the number of logical volumes belonging to the pool, and the capacity increment is considered to be the capacity of the source logical volume divided by the number of logical volumes belonging to the pool. However, it may also be permitted for the VIRTUAL LOGICAL VOLUME CONTROL PROGRAM 1002 to follow the area allocation of virtual logical volumes and logical volumes in Table 2001. For example, if the method of allocation is that a request for writing to an unallocated area of a virtual logical volume is allocated to the area of one logical volume and that, if no more free capacity is available in that logical volume, the request is allocated to the next logical volume, the number of accesses to the source logical volume is not divided by the number of logical volumes belonging to the pool, but it is calculated as they are allocated to one logical volume.

Furthermore, though this embodiment refers to Table 2201 after creating a virtual logical volume at the step S2705, it may also be possible for the VOLUME MIGRATION PROGRAM 902 to migrate the logical volume in the column 2502 to the virtual logical volume in the column 2503.

Though this embodiment has shown an example of logical volume migration plan creation in the steps S2703, S2904 and S3103, other methods of logical volume migration plan creation may also be permitted as long as they take the number of accesses, the capacity and the power consumption into consideration.

Though this embodiment has shown an example of migrating all the logical volumes stored in the source storage system to the destination storage system, a part of logical volumes instead of all the logical volumes stored in the source storage system can be migrated. If, at the step S2804, the logical volumes selected at the step S2801 cannot be migrated to all the pools selected at the step S2802, this processing is supposed to proceed to the step S2805.

Note that, this invention may also be achieved by the programming codes of the software which achieves the functions in the above-mentioned embodiment. In this case, the storage media recording the programming codes is provided to the system or the device, and the computer (or a CPU or an MPU) of that system or the device reads the programming codes stored in the storage media. In this case, the programming codes read from the storage media themselves achieve the functions in the above-mentioned embodiment, and the programming codes themselves and the storage media which store them are considered to configure this invention. The storage media to provide such programming codes are, for example, flexible disks, CD-ROMs, DVD-ROMs, hard disks, optical disks, magnetic optical disks, CD-Rs, magnetic tapes, non-volatile memory cards and ROMs.

Furthermore, it may be permitted that the OS (Operating System) or other components operating in the computer, with reference to the commands of the programming codes, execute all or part of the actual processing, and by that processing, the functions in the above-mentioned embodiment are achieved. Another method may also be permitted that, after the programming codes read from the storage media have been written in the storage memory of the computer, with reference to the commands of the programming codes, the CPU or other components of the computer execute all or part of the actual processing, and by that processing, the functions in the above-mentioned embodiment are achieved.

Another method may also be permitted in which, by distributing via the network, the programming codes which achieve the functions in the above-mentioned embodiment, they are stored in the storage means in the system or the device such as hard disks and memories, or the storage media such as CD-RWs and CD-Rs, and when using the system, the computer (or the CPU or the MPU) of the system or the device reads the programming codes stored in the relevant storage means or the relevant storage media and executes them.

REFERENCE SIGNS LIST

101 MANAGEMENT COMPUTER
102 SOURCE STORAGE SYSTEM
103 DESTINATION STORAGE SYSTEM
104 HOST COMPUTER
105 MANAGEMENT NETWORK
106 STORAGE AREA NETWORK
201 RACK
202 DISK CHASSIS
203 CONTROL CHASSIS
204 POWER DISTRIBUTION BOARD
301 VIRTUAL CONTROL CHASSIS
401 CPU
402 MAIN MEMORY
403 BUS
404 INTERFACE #1
405 INTERFACE #2
406 INTERFACE #3
407 HDD
408 ELECTRIC POWER SUPPLY
501 MAIN MEMORY
701 CPU
702 MAIN MEMORY
703 BUS
704 INTERFACE
705 HDD
706 KEYBOARD
707 MOUSE
708 DISPLAY

The invention claimed is:

1. A storage system comprising:
a first storage system comprising a first controller and a first disk chassis, the first disk chassis including an electric power supply coupled to a first plurality of disk drives which provide a plurality of first logical volumes;
a second storage system comprising a second controller, a second disk chassis and a third disk chassis, each of the second and third disk chassis including an electric power supply coupled to a second plurality of disk drives which provide a plurality of second logical volumes, the second controller providing a virtual logical volume comprising the second logical volumes in both the second and the third disk chassis; and a management computer which considers one of the first logical volumes of the first storage system to be a source volume, considers the virtual logical volume of the second storage system to be a destination volume, and controls the processing of migrating the source volume to the destination volume, wherein:

the first storage system has source configuration information including information on the capacity of and the number of accesses to the source logical volume, the second storage system has destination configuration information including the capacity of and the number of accesses to the virtual logical volume, and the number of accesses to each of the second logical volumes included in the virtual logical volume, the management computer, with reference to the source configuration information and the destination configuration information, calculates access increments of each of the second logical volumes included in the destination volume, by dividing the number of accesses to the source volume by the number of the second logical volumes included in the destination volume, the management computer, with reference to the source configuration information and the destination configuration information, calculates capacity increments of each of the second logical volumes included in the destination volume, by dividing the capacity of the source volume by the number of the second logical volumes included in the destination volume, the management computer calculates a power consumption value of each of the second and the third disk chassis, respectively, with reference to a formula which is determined by information including the sum of the number of accesses and the access increments to each of the second logical volumes, and a disk device type included in each of the second and the third disk chassis, the management computer determines that the source volume can be migrated to the destination volume if the following conditions are satisfied: the total sum of the number of accesses and access increments of the destination volume is smaller than or equal to an allowable number of accesses of the destination volume, the amount of the capacity increments of the destination volume is smaller than or equal to a free capacity of the destination volume, and the power consumption value of each of the second and the third disk chassis is smaller than or equal to an allowable power consumption value, the management computer, if the migration is determined to be possible, proposes the relevant virtual logical volume as a migration plan, and the management computer, if the management computer is instructed to migrate the source volume to the destination volume according to the migration plan, performs the migration of the source volume to the destination volume, and then terminates the first storage system.

2. The storage system according to claim 1, wherein:

the second storage system includes multiple virtual logical volumes, the management computer, if prioritizing the power consumption reduction is instructed, selects a logical volume of the largest capacity as the source volume, and selects a virtual logical volume of the largest capacity as the destination volume, and the management computer, if prioritizing the prevention of performance deterioration is instructed, selects a logical volume of the largest number of accesses as the source volume, and selects a virtual logical volume of the largest safety margin of the number of accesses as the destination volume.

3. The storage system according to claim 1, wherein:

the second storage system includes multiple virtual logical volumes, the management computer, if prioritizing the power consumption reduction is instructed, selects a logical volume of the largest capacity as the source volume, and selects a virtual logical volume of the largest capacity as the destination volume, and the management computer, if prioritizing the prevention of performance deterioration is instructed, selects a logical volume of the largest number of accesses as the source volume, and selects a virtual logical volume of the largest safety margin of the number of accesses as the destination volume.

4. The storage system according to claim 1, wherein the management computer determines that the source volume can be migrated if the power consumption value of the destination chassis obtained by the calculation is smaller than or equal to a first allowable power consumption value of the relevant destination chassis.

5. The storage system according to claim 4, wherein the management computer, if the management computer is instructed to migrate the source volume to the destination volume according to the migration plan, performs the migration of the source volume to the destination volume, and then terminates the first storage system.

6. The storage system according to claim 5, wherein:

the second storage system includes multiple virtual logical volumes and configuration information including information on the capacity of and the number of accesses to each of the multiple virtual logical volumes, the management computer, after the migration is performed, calculates the current power consumption value of the destination chassis including the destination volume with reference to the formula for the power consumption value, the management computer determines whether the current power consumption value exceeds a second allowable power consumption value which is larger than the first allowable power consumption value, and the management computer, if the current power consumption value exceeds the second allowable power consumption value, creates a logical volume migration plan in which the destination volume obtained by the migration processing is considered as a new source volume, and a virtual logical volume which is in the second storage system and is different from the new source volume is considered as a new destination volume.

7. The storage system according to claim 6, wherein:

the management computer calculates, by using a configuration information of the new destination volume obtained from the second storage system, increments of accesses and increments of the capacity when the new source volume is migrated to the new destination volume, the management computer calculates the power consumption value of the destination chassis with reference to the specific formula for the power consumption which is determined by the information including the number of accesses and access increments of the new destination volume and the disk device type included in the destination chassis, the management computer, with reference to the access increments, the capacity increments, and the power consumption value of the destination chassis obtained by the calculation, determines whether the new source volume can be migrated to the new destination volume, and the management computer, if the migration is determined to be possible, proposes the relevant new destination volume as a migration plan.

8. The storage system according to claim 7, wherein, when there are multiple virtual logical volumes that exceed the second allowable power consumption value:

the management computer, if prioritizing the power consumption reduction is instructed, selects a logical volume of the largest capacity among the multiple virtual logical volumes that exceed the second allowable power consumption value as the new source volume, and selects a virtual logical volume of the largest capacity among the multiple virtual logical volumes smaller than or equal to the second allowable power consumption value as the new destination volume, and the management computer, if prioritizing the prevention of performance deterioration is instructed, selects a logical volume of the largest number of accesses among the multiple virtual logical volumes that exceed the second allowable power consumption value as the new source volume, and selects a virtual logical volume of the largest safety margin of the number of accesses among the multiple virtual logical volumes smaller than or equal to the second allowable power consumption value as the new destination volume.

9. The storage system according to claim 5, wherein, after the migration is performed, in the second storage system including multiple virtual logical volumes, if changing the setting is instructed between the first setting of prioritizing the power consumption reduction and the second setting of prioritizing the prevention of performance deterioration:

the management computer, in response to the instruction for the setting change, selects a second logical volume to be changed and a change destination second logical volume which is the destination of the relevant second logical volume to be changed, the management computer calculates the power consumption value after the setting change with reference to increments of accesses and increments of the capacity when changing to the destination logical volume and the formula for the power consumption, the management computer compares the power consumption value after the setting change with the first allowable power consumption value, and determines if the setting change is possible, and the management computer, if the setting change is determined to be possible, proposes the change destination logical volume as a change plan.

10. The storage system according to claim 9, wherein, if changing from the first setting to the second setting is instructed, the management computer selects a logical volume of the largest capacity in a pool of the largest capacity among multiple pools of virtual logical volumes as the logical volume to be changed, and selects a logical volume in a pool of the smallest capacity as the change destination logical volume.

11. The storage system according to claim 9, wherein, if changing from the second setting to the first setting is instructed, the management computer selects a logical volume of the largest number of accesses in a pool with the smallest number of empty accesses among multiple pools of virtual logical volumes as the logical volume to be changed, and selects a logical volume in a pool with the largest number of empty accesses as the change destination logical volume.

12. A method for controlling a storage system, the storage system including a first storage system including a first controller and a first disk chassis, the first disk chassis including an electric power supply coupled to a first plurality of disk drives which provide a plurality of first logical volumes, a second storage system including a second controller, a second disk chassis and a third disk chassis, each of the second and third disk chassis including an electric power supply coupled to a second plurality of disk drives which provide a plurality of second logical volumes, and a management computer which controls data migration, wherein where the first storage system has source configuration information including information on the capacity of and the number of accesses to the first logical volumes and where the second storage system has destination configuration information including information on the capacity of and the number of accesses to the virtual logical volume and the number of accesses to each of the second logical volumes included in the virtual logical volume, the method of controlling the storage system comprising:

providing, by the second controller, a virtual logical volume comprising the second logical volumes in both the second and the third disk chassis;

determining, by the management computer, one of the first logical volumes of the first storage system to be a source volume, the virtual logical volume of the second storage system to be a destination volume;

calculating, by the management computer, with reference to the source configuration information and the destination configuration information, access increments of each of the second logical volumes included in the destination volume, by dividing the number of accesses to the source volume by the number of the second logical volumes included in the destination volume;

calculating, by the management computer, with reference to the source configuration information and the destination configuration information, capacity increments of each of the second logical volumes included in the destination volume, by dividing the capacity of the source volume by the number of the second logical volumes included in the destination volume;

calculating, by the management computer, a power consumption value of each of the second and the third disk chassis, respectively, with reference to a formula which is determined by information including the sum of the number of accesses and the access increments to each of the second logical volumes, and a disk device type included in each of the second and the third disk chassis;

determining, by the management computer, that the source volume can be migrated to the destination volume if the following conditions are satisfied: the total sum of the number of accesses and access increments of the destination volume is smaller than or equal to an allowable number of accesses of the destination volume, the amount of the capacity increments of the destination volume is smaller than or equal to the free capacity of the destination volume, and the power consumption value of each of the second and the third disk chassis is smaller than or equal to an allowable power consumption value;

proposing, by the management computer, if the migration is determined to be possible, the relevant virtual logical volume as a migration plan; and performing, by the management computer, if the management computer is instructed to migrate the source volume to the destination volume according to the migration plan, the migration of the source volume to the destination volume, and then terminates the first storage system.

13. The method according to claim 12, wherein the second storage system includes multiple virtual logical volumes, the method further comprising:

causing the management computer, if prioritizing the power consumption reduction is instructed, to select a logical volume of the largest capacity as the source volume and to select a virtual logical volume of the largest capacity as the destination volume, causing the management computer, if prioritizing the prevention of performance deterioration is instructed, to select a logical volume of the largest number of accesses as the source volume and to select a virtual logical volume of the largest safety margin of the number of accesses as the destination volume.

14. A non-transitory computer readable medium having instructions thereon for causing a storage system, including a first storage system which has a first controller and a first disk chassis, the first disk chassis including an electric power supply coupled to a first plurality of disk drives which provide a plurality of first logical volumes, a second storage system which has a second controller, a second disk chassis and a third disk chassis, each of the second and third disk chassis including an electric power supply coupled to a second plurality of disk drives which provide a plurality of second logical volumes, and a management computer which controls data migration, where the first storage system has source configuration information including information on the capacity of and the number of accesses to the first logical volumes and wherein the second storage system has destination configuration information including information on the capacity of and the number of accesses to the virtual logical volume and the number of accesses to each of the second logical volumes included in the virtual logical volume, to perform a method comprising:

providing, by the second controller, a virtual logical volume comprising the second logical volumes in both the second and the third disk chassis;

determining, by the management computer, one of the first logical volumes of the first storage system to be a source volume, the virtual logical volume of the second storage system to be a destination volume;

calculating, by the management computer, with reference to the source configuration information and the destination configuration information, access increments of each of the second logical volumes included in the destination volume, by dividing the number of accesses to the source volume by the number of the second logical volumes included in the destination volume;

calculating, by the management computer, with reference to the source configuration information and the destination configuration information, capacity increments of each of the second logical volumes included in the destination volume, by dividing the capacity of the source volume by the number of the second logical volumes included in the destination volume;

calculating, by the management computer, a power consumption value of each of the second and the third disk chassis, respectively, with reference to a formula which is determined by information including the sum of the number of accesses and the access increments to each of the logical volumes, and a disk device type included in each of the second and the third disk chassis;

determining, by the management computer, that the source volume can be migrated to the destination volume if the following conditions are satisfied: the total sum of the number of accesses and access increments of the destination volume is smaller than or equal to an allowable number of accesses of the destination volume, the amount of the capacity increments of the destination volume is smaller than or equal to the free capacity of the destination volume, and the power consumption value of each of the second and the third disk chassis is smaller than or equal to an allowable power consumption value;

proposing, by the management computer, if the migration is determined to be possible, the relevant virtual logical volume as a migration plan; and performing, by the management computer, if the management computer is instructed to migrate the source volume to the destination volume according to the migration plan, the migration of the source volume to the destination volume, and then terminates the first storage system.

* * * * *